(12) United States Patent
Garrecht et al.

(10) Patent No.: US 6,567,812 B1
(45) Date of Patent: May 20, 2003

(54) MANAGEMENT OF QUERY RESULT COMPLEXITY USING WEIGHTED CRITERIA FOR HIERARCHICAL DATA STRUCTURING

(75) Inventors: Thomas Garrecht, Munich (DE); Axel Loritz, Tutzing (DE); Anton Weiss, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 233 days.

(21) Appl. No.: 09/669,892

(22) Filed: Sep. 27, 2000

(51) Int. Cl.[7] .............................. G06F 7/00; G06F 17/00
(52) U.S. Cl. ...................................... 707/100; 707/102
(58) Field of Search .................................. 707/100, 102

(56) References Cited

U.S. PATENT DOCUMENTS 5,966,710 A * 10/1999 Burrows ..................... 707/103
6,237,006 B1 * 5/2001 Weinberg et al. ........... 707/103
6,304,864 B1 * 10/2001 Liddy et al. .................. 706/15

* cited by examiner

Primary Examiner—Safet Metjahic
Assistant Examiner—Cindy Nguyen
(74) Attorney, Agent, or Firm—Sughrue Mion, PLLC

(57) ABSTRACT

Collected user parameters include category 210, category weight 230, and value 240 information. A search support application creates 300 a query based on the user parameters. The query is sent to structured 450 and unstructured 470 databases, and heterogeneous query results are stored 630. Stored query results are ordered in a tree-shaped hierarchy (FIG. 8). The tree-shaped hierarchy has ordered levels of nodes 710–750 with levels corresponding to categories, and nodes 1.0–3.9 corresponding to values for categories. Leaf nodes 4.0–4.15 correspond to actual results 900–915, but the intermediate nodes 1.0–4.15 correspond to conceptual or meta relationships. Display of the results is restricted using the tree-shaped hierarchy to help manage result complexity.

21 Claims, 22 Drawing Sheets

Fig. 2

| Category | Min | Max | Value |
|---|---|---|---|
| animal | | | ostrich, eagle |
| usage | | | decoration, ornament, adornment, embellishment |
| material | | | feather, plume, quill |

210  220  230  240

US 6,567,812 B1

MANAGEMENT OF QUERY RESULT COMPLEXITY USING WEIGHTED CRITERIA FOR HIERARCHICAL DATA STRUCTURING

CROSS REFERENCE TO RELATED APPLICATIONS

This application is related to each of the following copending applications:

application Ser. No. 09/669,888, entitled "MANAGEMENT OF QUERY RESULT COMPLEXITY IN HIERARCHICAL QUERY RESULT DATA STRUCTURE USING SPACE CUBES", filed on Sep. 27, 2000.

application Ser. No. 09/669,889, entitled "PRESENTATION OF HIERARCHICAL QUERY RESULT DATA USING MULTIPLE DEGREES OF FREEDOM", filed on Sep. 27, 2000.

application 09/671,503, entitled "NAVIGATION OF HIERARCHICAL QUERY RESULT DATA SPACE USING PROBES AND OPERATIONS", filed on Sep. 27, 2000.

All of the foregoing applications are incorporated herein by reference in their entirety.

BACKGROUND OF THE INVENTION

This invention relates to automated search of heterogeneous data sources for desired information, and to the management of the information retrieved during the search.

Data and information are different, but inseparably intertwined. To understand a difference between data and information for the purposes of the following discussion, a simple example will be provided.

The financial page of a newspaper may be thought of as providing data. In particular, a newspaper's financial page may provide, for each of a plurality of stocks in a given market, a closing price and an indicator of the difference between the current closing price and an immediately preceding closing price. To a person attempting to discover the closing price of a particular one of the plurality of stocks, the financial page of the newspaper provides information. To a person attempting to discover whether the given market, as a whole, advanced or declined, the financial page of the newspaper provides data which might be aggregated and analyzed to find the direction of the market.

Taking the example further, the information as to whether the market advanced or declined as a whole may be thought of as data by a person attempting to determine whether there is a cycle of market advances or declines over a period of years. In turn, whether or not a given market advances or declines in a cyclic manner over a period of years may be merely data to yet another person attempting to discover whether there is any kind of link between cyclic markets and something more abstract, such as the number of representatives of a conservative political party elected subsequent to such cycles.

Data, in the abstract, may thus generally be thought of as being at a lower level than information. Whether an item more correctly qualifies as data or information is naturally dependent upon the point of view and on the discovery needs of a person. Because of the dynamic nature of the problems that confront people each day, the terms data and information are often interchangeably used.

A database may be understood to be a collection of data and information stored on a computer system. For the purposes of this discussion, such a general definition will generally be appropriate. Database management systems provide a level of independence between the raw data and programs that might be used to retrieve the data. Data can be retrieved from databases managed by database management systems by issuing appropriate function or procedure calls containing terms in a query definition language. The database management system response to the terms in a query definition language, such as SQL, by retrieving and returning the stored data that meets the parameters contained in the query.

Depending on the purpose of the system, different databases may have different levels of usefulness for those seeking to gain information from them. To explain, some database management systems are used to coordinate and to control information for the purpose of supporting online transaction processing (OLTP).

OLTP applications are characterized by many users creating, updating, or retrieving individual records, and so OLTP databases are optimized for transaction updating. The data is stored in a manner that is very useful for handling transactions, but a form that is much less useful for supporting analysis of the data.

One way to make this data more useful for high-level analysis is to reformat and to aggregate the data in a database specifically arranged for online analysis processing (OLAP). OLAP applications may be used by analysts and managers seeking a higher-level aggregated view of the data, such as total sales by product line, by region, and so forth. An OLAP database may be updated in batch, from multiple sources, and can provide a powerful analytical back-end to multiple user applications. OLAP databases are thus optimized for analysis.

It should be apparent, however, that such databases are in a highly structured format, and there is required intimate knowledge of the structured format to access the data to perform the appropriate analysis.

Not all data is managed by database management systems, and not all data in databases is highly structured. Some data in databases is stored in association with one or more indices. The data in the database is retrieved with reference to the one or more indices.

Oftentimes, the term "database" evokes a sense of structure in the data. However, for the purposes of this discussion, not all databases are structured databases. In particular, a collection of text documents may be thought of as being a database. Much of the institutional knowledge of an organization may be contained in the documents of the organization and not in the structured databases managed by the organization's database management systems. All of this organizational knowledge stored in text documents, while formerly unavailable for search, now is becoming useful as data with the advent of appropriate searching and querying tools.

For example, an organization may have a document management system that coordinates workflow with respect to documents, but also provides an index that can be used to find and retrieve documents across the organization. Likewise, an organization may use a text search processor to access a central database of text documents to find certain documents meeting the parameters of a text search query.

Web pages on the World Wide Web are typically text documents. A collection of such text documents may be thought of as an unstructured database. Thus, for the remainder of this discussion, a structured database will be understood to be one that has a definite structure and, typically, is controlled by a database management system. Likewise, an unstructured database will be understood to be one that is not controlled by a database management system and, typically, is a collection of text documents.

One of the biggest reasons for the importance of the World Wide Web is an advent of tools that make it possible to find and access the text documents that make up the Web pages of the World Wide Web. A brief look at some of the tools available to find information on the World Wide Web will now be undertaken.

A search engine may be thought of as a search database coupled with the tools to generate and search the search database. A search engine may be owned by a Web location service. A Web location service may be thought of as a Web site or a company that provides a way to find and locate Web pages having data that meets the information needs or discovery needs of a user.

Yahoo! is an example of a Web location service. Yahoo! attempts to provide a complete front end for the Internet by providing news, libraries, dictionaries, and other sources in addition to a search engine. Yahoo! emphasizes cataloging—a classification of identified pages into a hierarchical structure. Alta Vista and Excite are Web location services that emphasize providing the most comprehensive search database.

Some Web location services use the search engine technology of other companies, such as Inktomi, to provide a useful location service for Web pages and files while concentrating on providing other, additional services.

Every search engine may be thought of as providing three important elements. These elements include information discovery and search database components, a user search component, and a presentation component.

In particular, the information discovery and search database components of a search engine may obtain information by accepting information sent by persons hoping to gain greater exposure for their Web pages or by gathering the information using software programs designed to locate Web pages, and to store information about the pages and their location. Such software programs may be called Web crawlers, spiders, or robots. For convenience, such software programs may be herein referred to as robots, collectively.

When a robot identifies a new page, the robot may simply store the title of the page and the universal resource locator (URL). Web pages may include hyper-text markup language (HTML) meta-tags relating to content or keywords, and a robot may store also such information. An additional option is to store also the text of the Web page in part or in its entirety.

In any event, whatever the robot causes to be stored in the search database is indexed for quick retrieval.

The user search component of a search engine is the component with which the user enters the parameters of a query. It is conventional for a user to have the ability to type in a few relevant words into a search form. Some user search components of search engines even permit the user to specify whether the words must be in the title of a page, in the URL, in the meta-tags, or anywhere. Such so-called advanced search options also include Boolean operations. Furthermore, search engines typically attempt to take into account approximate spellings, plural variations, and truncation.

The presentation component of a search engine presents the results of a user query to the user. Given the immense size of the World Wide Web, it is possible for a given query to generate millions of results indicating millions of pages that may have potentially relevant data. Most engines find more sites from a typical search query than could ever be processed by a person. Search engines may assign each document "hit" some measure of the relevance of the page to the search query. Such relevance scores may is reflect the number of times a search term appears in a page, with adjustments being possible when the search term appears in the title, in the meta-tags, in the beginning of the page, and the like. For example, a document having all of a plurality of search terms might be given a relevance score weighted differently than a document containing fewer than all of the search terms, although with greater frequency.

Some engines allow the user to alter the relevance score by giving different weights to each search word. The weights do not affect the retrieval of data, but do affect the relevance score and, ultimately, the ordering of the results (i.e., the ordering of the "hit list").

Where relevance scores are substantially the same for a plurality of results, the presentation component of a search engine typically orders those results alphabetically. Along with the URL of the page, the presentation component may provide also a summary of each page. Such a summary may be composed of the title of a document and some text from the beginning of the document, and/or an optional author-specified summary given in a meta-tag.

The results of a web search are typically returned in a list of documents or pages in an order based on the relevance score, together with identifiers relating to the pages, such as a page title, URL, or summary.

Web searching, then, may be thought of as the providing of parameters to a search engine using an interface of the user search component; causing the search engine to conduct a search of one or more indices available to the search engine to determine pages that qualify as matches with or as being relevant to the parameters (i.e., "hits"); evaluating the relevance of the hits to provide a relevance score; and returning to the user a list of results ordered first according to the computed relevance score and then according to alphabetic precedence.

The list of results is not particularly helpful in all situations, because the list is typically ordered in only one degree of freedom, namely, the relevance score. Nevertheless, this is the manner in which nearly all search engines present the results of a user query.

Some search engines provide a presentation that is slightly more useful in one sense, and less useful in another sense. In particular, some search engines provide the user the option to group the results by the Web site. Thus, when several pages of one site are hits for a given user query, these several pages are grouped together under a common entry that indicates the identity of the Web site.

Overall, the groups are presented in an order by the relevance of the group, typically determined by the number of pages grouped together to form the group.

The grouping of results by Web site is useful in that it gives the user a better intuitive feel for the overall content of the particular Web site, and provides elementary organization of the data. The grouping is unuseful to the extent that it tends to hide results, even particularly relevant results, for groups that are not deemed as relevant as groups having a greater number of pages having hits. To put it another way, if a query resulted in only one highly relevant page of a particular Web site being hit, and resulted in a plurality of marginally relevant pages of another Web site being hit, the grouping approach described above would result in the Web site of marginally relevant pages being presented first, and the Web site with the only one highly relevant page possibly being presented quite far down on the list.

The simple list format is unuseful in part because, to the user, it is in a relevance order that cannot be readily understood or appreciated. Furthermore, the list is typically nothing more than a huge amount of data presented serially. The human mind is not inherently capable of coping with so much information.

The existence of substantial numbers of large databases in organizations, and the possibility to query large numbers of Web pages on the internet has helped bring about the concept of Data Mining. Data mining, in general, may be understood to mean the extraction of new information from existing data, and also may be understood to include the use of query and analysis tools such as search engines and the like.

Data mining extracts new information from data. Data mining tools are seen by their proponents as doing more than query and analysis tools, more than OLAP tools, and more than statistical techniques like variance analysis. Data mining tools are thought to be useful for helping provide answers to certain kinds of questions.

Whereas more simple query and analysis tools are useful for questions such as, "Is there a cycle of stock prices in Market X?" a data mining tool is what might be used to answer even more abstract relationship questions such as, "What are the factors that determine the period of the stock price cycle of Market X?"

Traditionally, answers to the more complex relationship oriented questions are discovered by a human analyst who starts with a question, assumption, or hypothesis, and attempts to determine whether the data fits a model that embodies the analyst's theory. By testing the model, the analyst eventually and iteratively modifies the model to fit the data and, from the completed model, may arrive at a conclusion. Data mining tools help this process along by facilitating the finding of an appropriate model.

Data mining tools may be said to create analytical models that are predictive and/or descriptive. Predictive models predict future values given a past history, and descriptive models focus more on information about the relationships in the underlying data. Models often tend to be both predictive and descriptive.

Data mining may be thought of as part of a larger iterative process which may be called knowledge discovery. Knowledge discovery may include steps of defining a problem; collecting and ordering data; data mining the data to select a model; testing the model; using the model for making decisions; and monitoring the data and model to detect changes over time.

Although some data mining tools exist to support the data mining of the collected and ordered data, there exists a dearth of tools that are helpful in collecting and ordering data. The best tools available require the data to be highly structured and to be well-behaved. Such tools are closely tied to the highly structured data, and are useless and impossible to employ outside their particular tailored environment where data is not structured and not well-behaved (such as the vast database of Web pages in the World Wide Web).

The tools that are appropriate for handling the unstructured and heterogeneous data are quite primitive, and are insufficient in their retrieval and presentation of results. There is a need for a better tool to collect and order data that is from heterogeneous sources, and that includes unstructured or structured data. Such a tool would have potential for being useful not only for data mining, but also for simply helping persons to find, in the seemingly infinite data universe of the available databases, the information they need to satisfy an information requirement.

Inasmuch as the preferred embodiments of the invention, described below, are implemented in the computer arts, it will be helpful to set forth some background information and definitions before summarizing the invention.

DEFINITIONS

Computer Systems

One embodiment of this invention resides in a computer system. Here, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

Computer Program Products

Another embodiment of the invention resides in a computer program product, as will now be explained.

On a practical level, the software that enables the computer system to perform the operations described further below in detail, may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a ROM, a CD, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software is associated with a computer usable medium.

For the sake of simplicity, therefore, the term "program product" is thus used to refer to a computer useable medium, as defined above, which bears in any form of software to enable a computer system to operate according to the above-identified invention.

Thus, the invention is also embodied in a program product bearing software which enables a computer to perform according to the invention.

Carrier Wave

Although it has been mentioned, above, that a computer program product includes the carrying of software over a communications mode (such as a download over the Internet), it can be useful also to look at such a situation as a particular kind of carrier wave. To be more particular, the invention resides, in one embodiment, also in a carrier wave that carries the software that enables a computer to perform according to the invention. In this sense, it may be said that the carrier wave includes certain code sections corresponding to the various steps involved in the execution of the invention.

It will be appreciated that a carrier wave includes not only signals or files downloaded over the Internet, but also over any network and over any communication medium.

User Interfaces

The invention is also embodied in a user interface invocable by an application program. A user interface may be understood to mean any hardware, software, or combination of hardware and software that allows a user to interact with a computer system. For the purposes of this discussion, a user interface will be understood to include one or more user interface objects. User interface objects may include display regions, user activatable regions, and the like.

As is well understood, a display region is a region of a user interface which displays information to the user. A user activatable region is a region of a user interface, such as a button or a menu, which allows the user to take some action with respect to the user interface. It will be appreciated that, depending on the situation, a particular region of a user interface might be both a display region and a user activatable region.

A user interface may be invoked by an application program. When an application program invokes a user interface, it is typically for the purpose of interacting with a user. It is not necessary, however, for the purposes of this invention, that an actual user ever interact with the user interface. It is also not necessary, for the purposes of this invention, that the interaction with the user interface be performed by an actual user. That is to say, it is foreseen that the user interface may have interaction with another program, such as a program created using macro programming language statements that simulate the actions of a user with respect to the user interface.

Applications Programs

An application program may be several separate programs, only one program, a module of a program, or even a particular task of a module.

An applications program may be written by an applications programmer. Applications programmers develop applications programs using any of a number of programming languages. During development and design of applications programs, applications programmers may adhere to a programming methodology. A programming methodology is a set of principles by which analysis is performed and by which design decisions are made. Programming methodologies may be referred to as programming paradigms. Examples of widely-known programming paradigms include the top-down, the data-driven, and the object oriented (OO) programming paradigms.

The Object Model

The OO paradigm is based on the object model. One of skill in the art readily understands the object model. For detailed information concerning the object model, a useful book, which herein is incorporated in its entirety by reference, is "Object-oriented Analysis and Design", by Grady Booch (Addison-Wesley Publishing Company).

Recently, object oriented analysis and design (OOAD) and object oriented programming (OOP) have been the focus of great attention. OOAD and OOP are thought to provide advantages with respect to abstraction, encapsulation, modularity, and hierarchy. Furthermore, OOAD is thought to provide for improved software reuse and better adaptability to change.

According to the object model, a software system is modeled as collections of cooperating objects. Individual objects are treated as instances of a particular class. Each class has a place within a hierarchy of classes.

An object is understood to have a unique identity, to have a state, and to exhibit behavior. The behavior of an object relates to the set of operations that may be performed by the object. Such operations are also known, interchangeably, as methods of the object or as member functions of the object.

Member functions of an object are invoked by passing the object an appropriate message.

An object may retain data of interest. Passing the object appropriate messages may invoke a member function of the object to manipulate the data. For example, an object presently might retain an image of the Washington Monument, and might have a member function for rotating an image. Under the object model, when an appropriate message, such as "rotate image 45 degrees", is passed to the object the rotating member function is invoked and the image is rotated 45 degrees. The image, thus rotated, is retained in this state.

The invoking of member functions of objects to perform tasks is a central concept of the OO paradigm.

Objects can be related to each other. Two objects might have a client/supplier relationship. Such objects are said to be linked. Two objects might have a hierarchical relationship. For example, one object might represent a finger and another a hand. The hand object may thus be said to be higher in a hierarchy than the finger. Assuming the hand has more than one finger, there might be several finger objects that are so related with the hand object. Hierarchically related objects are said to be aggregated. In particular, the hand object and its finger objects may be referred to as an aggregate, or an aggregation. The finger objects may be referred to as being attributes, or members of the aggregation. The hand object, by virtue of its position at the "top" of the hierarchy in the aggregation, may be referred to as an aggregating object.

An object cannot be considered without regard to its class. Every object, when constructed, receives its structure and behavior from its class. An object may be referred to as a class instance, or as an instance of a class. Classes, in the object model, may be hierarchically related. In particular, the relationship between two classes may be a subclass/ superclass relationship. A subclass may inherit the structural and behavioral features of its superclass.

Thus, whenever an object is constructed, it receives important attributes from its class. If that class is a subclass of a particular superclass, the object may receive certain attributes from the superclass as well.

Class Libraries

Classes, on a practical level, may be supplied in class libraries on any one of a variety of media. Class libraries may be understood to be a kind of software. Thus, the class definitions contained in class libraries also are actually statements written in a programming language that, when executed by a computer, cause the computer to act in accordance with the particular content of the statements. Furthermore, a class library may be provided in any number of forms including, but not limited to, original source code, assembly code, object code, machine language, compressed or encrypted versions of the foregoing, and any and all computer readable equivalents.

One of skill in the art will therefore appreciate that a class library may be embodied in a computer program product as that term has already been defined, above.

SUMMARY OF THE INVENTION

The invention has been created with an object of compensating for the above-identified shortcomings and disadvantages of the prior art. This object of the invention includes, at least in part, providing a better tool to collect and order data that is from heterogeneous sources, and that includes unstructured or structured data.

More particularly, the invention resides, in one embodiment, in a method of performing a search using weighted search parameters. The search parameters are combined to produce a search, and the results are retrieved. The results are retrieved from structured and/or unstructured databases, and arranged into a hierarchy.

The hierarchy is a tree with a control node at the root, and ordered levels of nodes corresponding generally to the search parameters. The terminal leaf nodes correspond to actual pages, but the intermediate nodes correspond to only conceptual or meta relationships.

It will be appreciated that the invention also resides in a computer program product, a user interface, a computer system, and a computer data signal for implementing the method.

BRIEF DESCRIPTION OF THE DRAWING FIGURES

FIG. 2 shows user interface objects according to an embodiment of the invention.

DETAILED DESCRIPTION OF THE PREFERRED EMBODIMENTS

The operation of a presently preferred embodiment of the invention will now be described. A user is presented with an interface in which the user may input one or more parameters. The exact format of the interface is not important, and the interface shown is for illustration purposes only.

Figure 1:
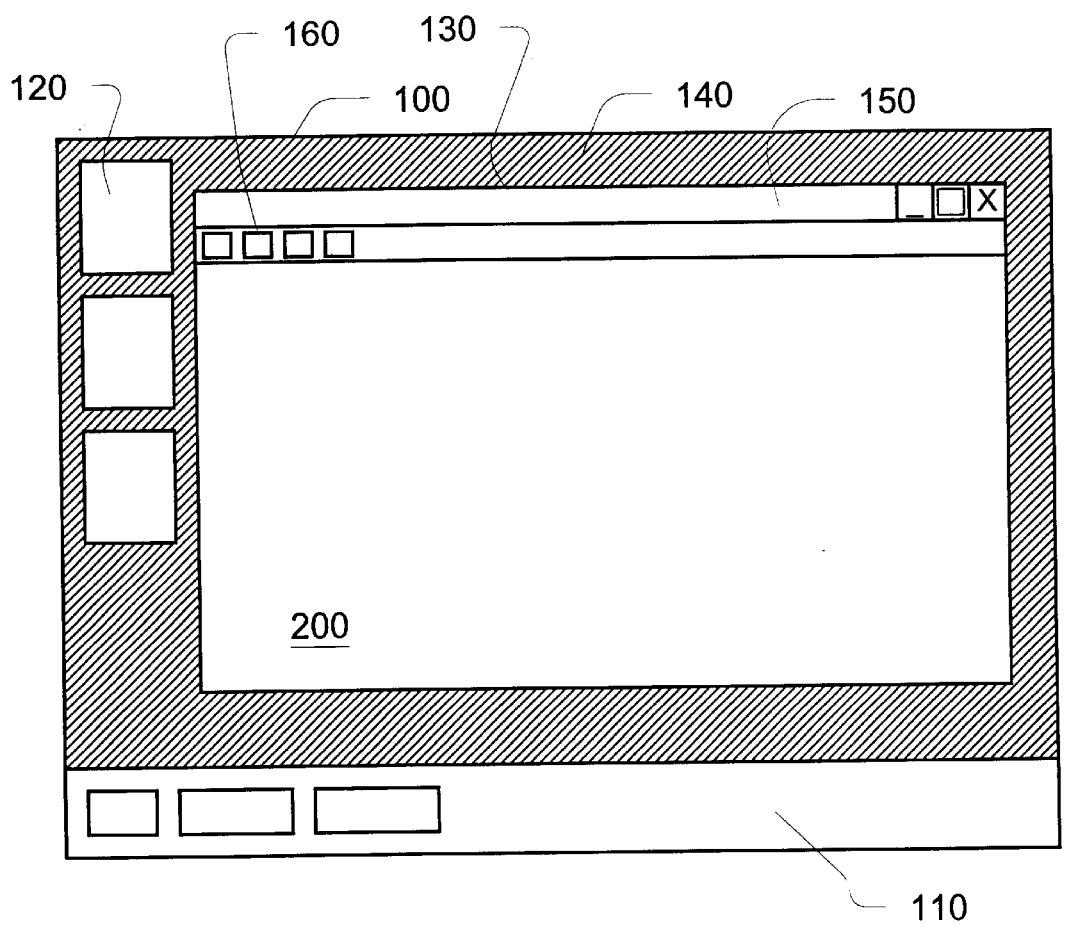
FIG. 1 shows a typical computer display.

In FIG. 1, there is shown a computer display 100. In this particular example, the computer display has a status area 110, various program icons 120, an active window 130, a title bar 140 for the active window 130, a toolbar 150 and tool buttons 160, and a window area 200. There are many possible graphical user interfaces, and the graphical user interface depicted in FIG. 1 is shown only to facilitate the explanation provided herein.

FIG. 2 shows an example of some user interface objects which may be used to obtain user inputs. In particular, a plurality of user activatable regions 210 permit a user to enter various categories for a search. In the example shown in FIG. 2, the categories "animal", "usage", and "material" have been entered into respective user activatable regions 210. The user activatable regions 210 may be referred to as category entry regions.

User activatable regions 220 include slider bars 230 which are used to provide a priority or weighting of the different categories entered into the category entry regions. As shown in FIG. 2, the further to the right a slider bar 230 is placed, the higher the priority of the corresponding search parameter. The further to the left a slider bar 230 is placed, the lower the priority of the corresponding search parameter. Stated differently, the search parameter having the slider bar moved most to the "Max" position is the parameter with the heaviest or greatest weight. Likewise, the parameter having the slider bar moved closest to the "Min" position has the lightest or least weight. For convenience, the user activatable regions 220 may be referred to as weighting regions.

Also shown in FIG. 2 is a plurality of user activatable regions 240. These regions are used to provide specific values for searching, each of these corresponding to the category indicated in the category entry region. For example, the values corresponding to the category "animal" are "ostrich" and "eagle". The values "decoration", "ornament", "adornment", and "embellishment" correspond to the category "usage". Finally, the values "feather", "plume", and "quill" correspond to the category "material". For convenience, user activatable regions 240 may be referred to as value entry regions.

In the exemplary case shown in FIG. 2, the category "animal" is given the heaviest weight; the category "material" is given the next heaviest weight; and the category "usage" is given the least heaviest weight. These parameters and weightings might be used by someone interested in finding out information relating to decorations made with ostrich or eagle feathers, or how to obtain such feathers to use in decorations, or the like.

For the sake of convenience, the categories in the category entry regions 210, the weights indicated in the weighting regions 220, and the values in value entry regions 240 may be collectively referred to as user parameters.

Figure 3:
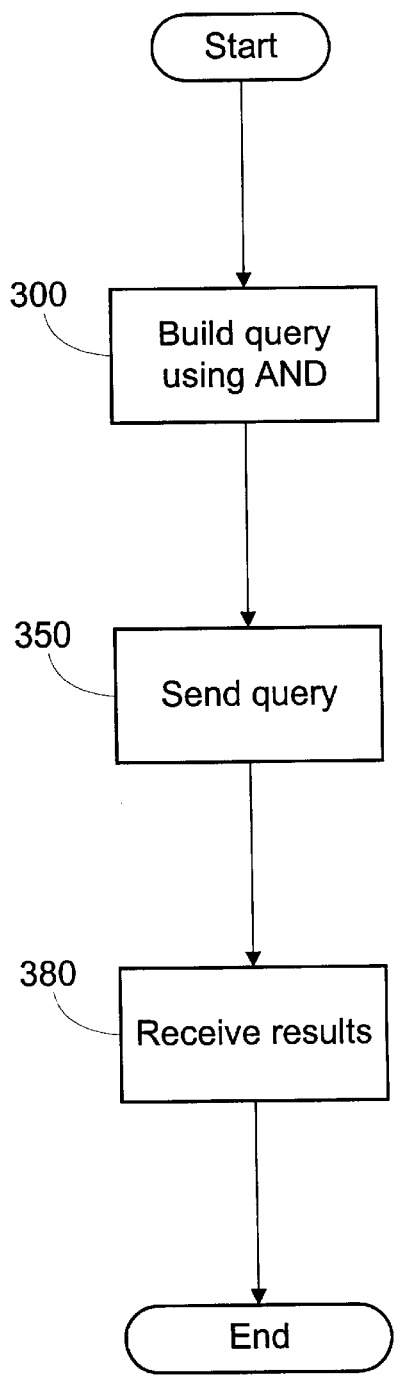
FIG. 3 shows a flow diagram of an operation carried out in response to user parameter entry.

FIG. 3 shows a flow diagram of an operation that may be carried out when the user has completed entering the user parameters and has further activated another user activatable region (not shown) which indicates to the system that the entry of user parameters is complete. In FIG. 3, step 300 involves building a query using the Boolean connector "AND". In particular, the values within each of the value entry regions 240 are combined with a Boolean "OR" operation, and the resulting Boolean clauses are combined using the "AND" operation. Thus, with the inputs shown in FIG. 2, the query built would be:

(ostrich OR eagle) AND (decoration OR ornament OR adornment OR embellishment) AND (feather OR plume OR quill)

In FIG. 3, step 350 involves sending the query to the databases or search engines which will be used to obtain a hit list. In this sense, the databases and/or search engines to which the query is sent may be understood to be the query search universe. The query search universe could consist of only one or several databases and/or search engines. One manner of accomplishing this will be described shortly. The results are obtained and collected in step 380.

The manner in which a query is sent to the query search universe will now be briefly described with reference to FIG. 4, in which 410 indicates a network such as the Internet, 420, 440, and 460, indicate various servers that interface with the network 410, 430 indicates a terminal of a user (also referred to as a user station, user terminal, or client terminal), 450 indicates a structured database, and 470 indicates a non-structured database such as a website.

More particularly, a user accesses a search application on server 420 using terminal 430. The search application on server 420 could be hosted on terminal 430, but in the present simplified example the software comprising the search application happens to reside on server 420. The search application includes a component which interfaces with the terminal 430 so as to display on the terminal a graphical user interface such as that shown in FIGS. 1 and 2.

The server 420 interfaces with the network 410 (which will be referred to as the Internet for the sake of this example).

The servers 440 and 460 also interface with the Internet. These servers are intended to be representative only, and it is envisioned that there might be many different servers located worldwide. Server 440 provides access to the structured database 450. The particular location of structured database 450 is not important, and it will be appreciated that the structured database 450 could equally well be hosted by server 420 or server 460.

Server 460 provides access to a non-structured database 470 which will be referred to as a website for the purposes of this example. The non-structured database 470 includes a plurality of pages, typically in HTML, XML, or the like. The particular location of the HTML pages 470 is not important, and they could equally well be hosted on either of servers 420 or 440.

Figure 4:
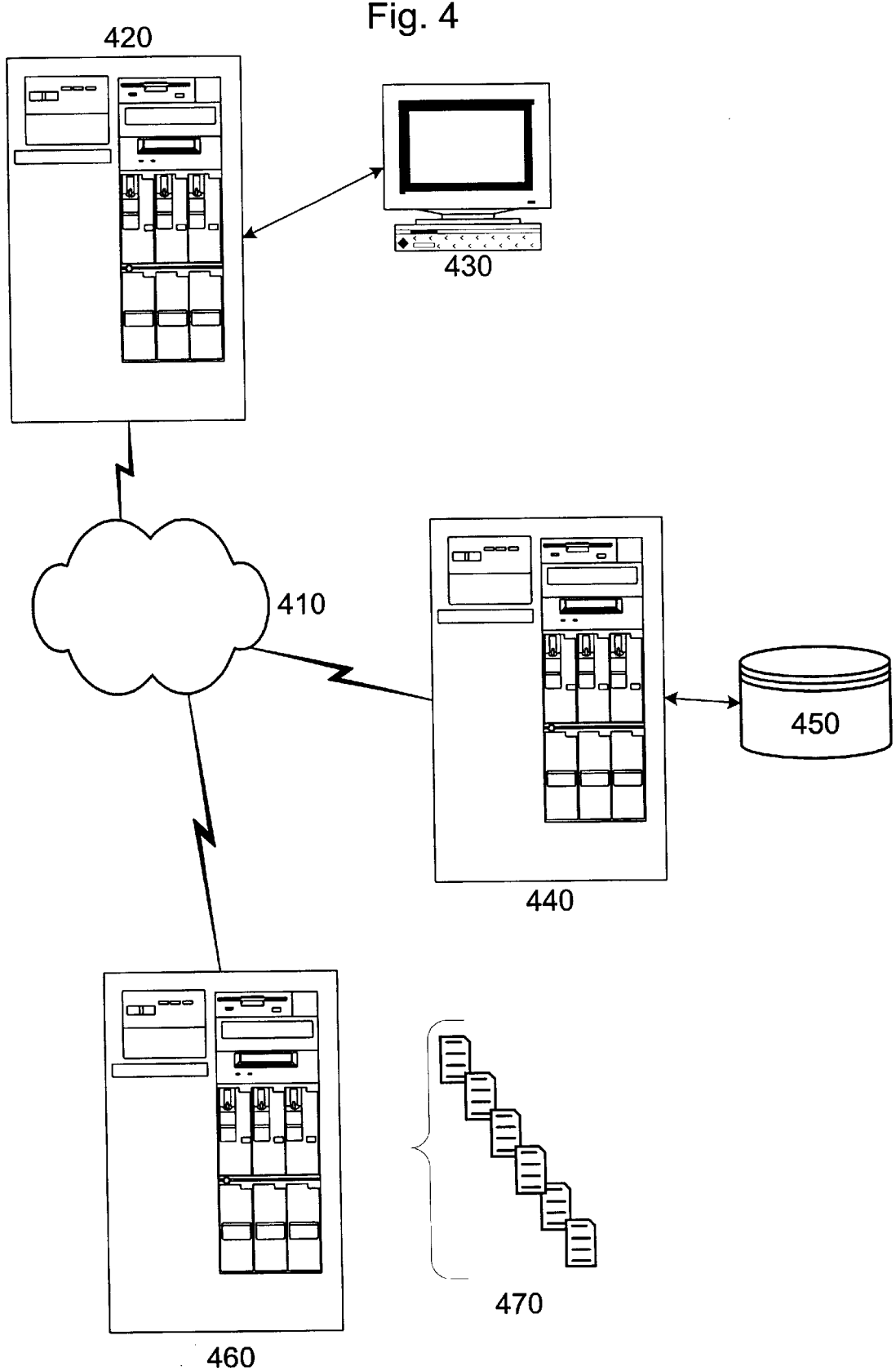
FIG. 4 shows an exemplary network in simplified schematic form.
Figure 5:
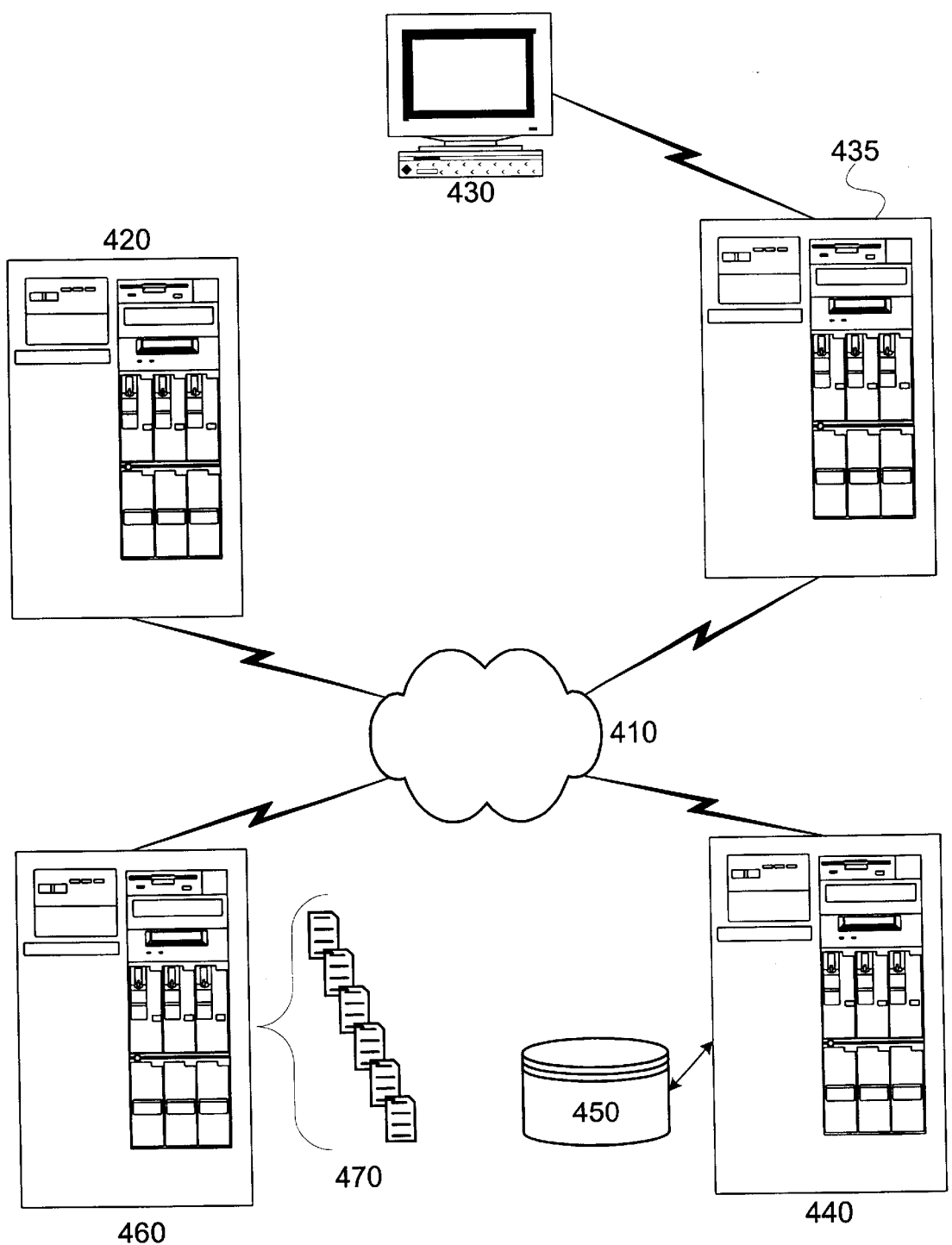
FIG. 5 shows another exemplary network in simplified schematic form.

FIG. 5 shows an alternative arrangement which is also one of the preferred embodiments of the invention. The difference between FIG. 5 and FIG. 4 is that the user terminal 430 is connected to a user server 435, and not to the application server 420. The user server 435 may be a server of a local area network to which the user terminal 430 is connected. The user server 435 may also be an Internet service provider (ISP) to which the user terminal 430 connects via a modem connection or the like.

For the sake of simplicity of explanation, the arrangement of FIG. 4 will be referred to throughout most of the description, but it will be appreciated that the description applies equally well to the arrangement shown in FIG. 5.

Figure 6:
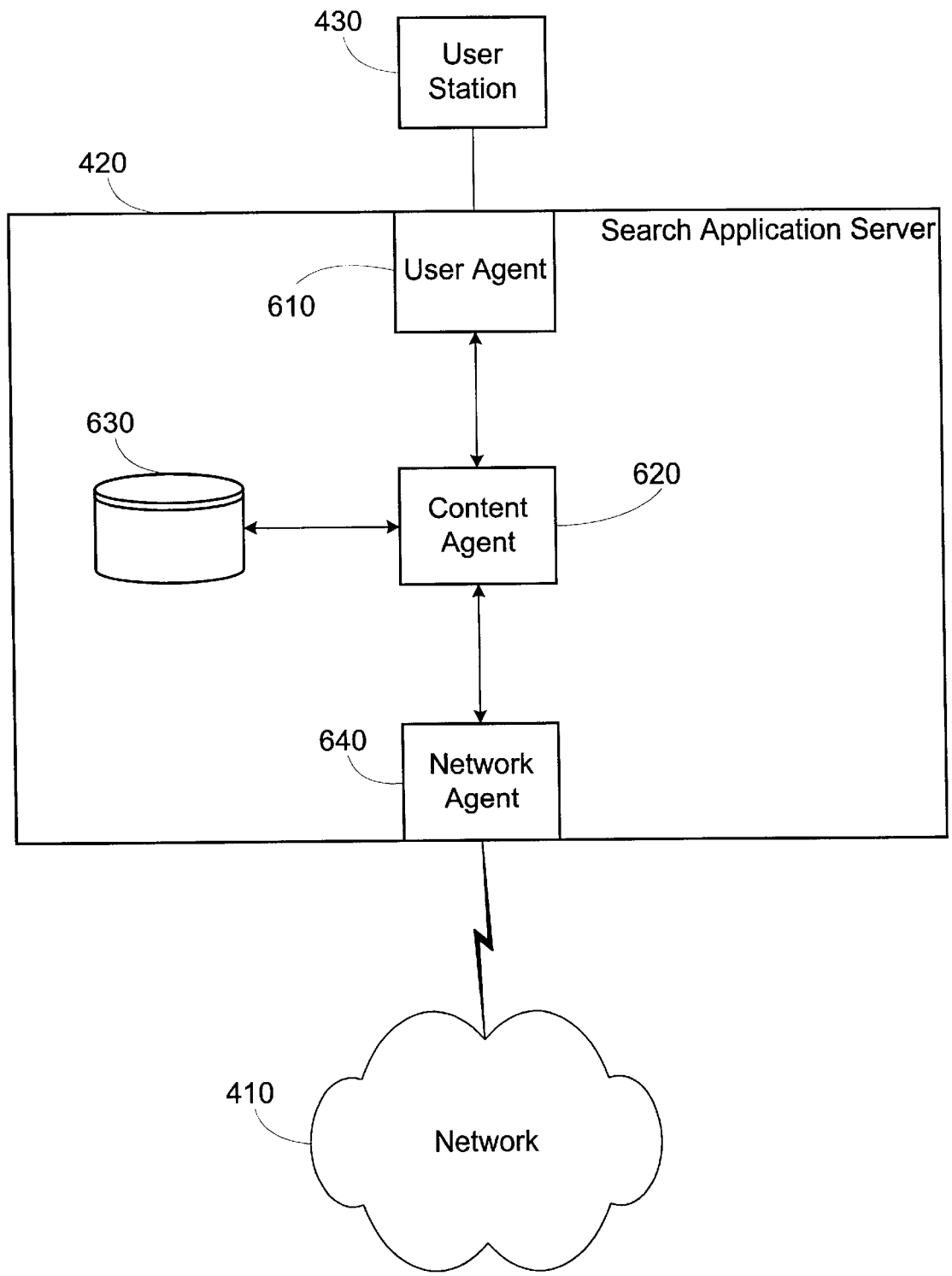
FIG. 6 shows a simplified schematic view of cooperation between user station, server, and network in an embodiment of the invention.

FIG. 6 shows how the user station 430, the search application server 420, and the Internet 410 cooperate. In particular, the search application server 420 includes a user agent 610, a content agent 620, a data storage 630, and a network agent 640. The user agent 610 takes care of the necessary interface tasks so as to effect communication with user station 430. The network agent 640 takes care of the necessary interface tasks so as to effect.communication with the Internet 410.

The content agent 620 receives the user parameters from the user agent 610 and undertakes the steps shown in FIG. 3. The content agent 620 sends the query to the network agent 640 for distribution to one or more databases. When the network agent 640 returns the results from the Internet and/or other databases, the results are provided to the content agent 620.

Mobile code agent technology, in which the network agent sends out mobile agents for information gathering, could be employed so as to achieve a more decentralized approach for improved performance and scalability.

The content agent 620 stores the user parameters and the query results in a storage area 630, which may or may not be located in the search application server 420. The table below summarizes information retrieved based on the user parameters as shown in the example of FIG. 2. More particularly, it is assumed for the present that the search was conducted in this case using only the Internet, with one or more search engines being used by the network agent 640. In this case, there were only 16 hits, and these have been summarized and enumerated as hits or results 900 through 915.

TABLE 1

| Result | Information |
|---|---|
| 900 | ostrich, feather, ornament |
| 901 | ostrich, feather, ornament |
| 902 | ostrich, quill, decoration |
| 903 | ostrich, quill, ornament |
| 904 | ostrich, quill, adornment |
| 905 | ostrich, quill, embellishment |
| 906 | ostrich, quill, embellishment |
| 907 | ostrich, quill, embellishment |
| 908 | ostrich, plume, decoration |
| 909 | eagle, feather, ornament |
| 910 | eagle, feather, decoration |
| 911 | eagle, feather, adornment |
| 912 | eagle, feather, adornment |
| 913 | eagle, feather, adornment |
| 914 | eagle, quill, ornament |
| 915 | eagle, quill, ornament |

In the above table, the column labeled "Information" includes just the meta tags, although it will be appreciated that the information used as hit information could very well include the title of a Web page, or certain words found in the body of the document, or words included in the URL of the document.

Figure 7:
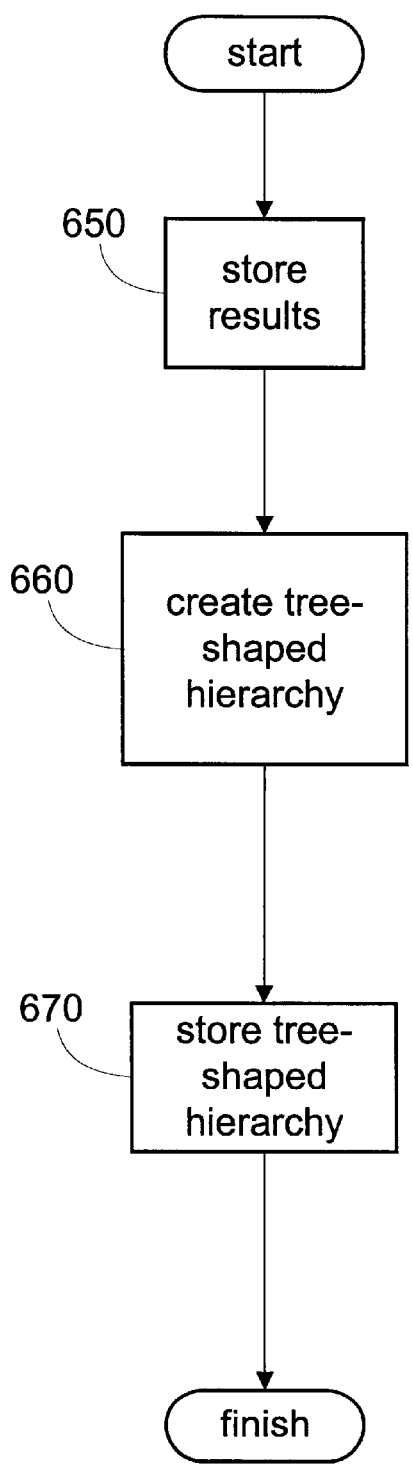
FIG. 7 shows a flow diagram of a result processing operation according to an embodiment of the invention.

The 16 hits comprising the hit list are provided by the network agent 640 to the content agent 620 and stored in the storage 630. This step is shown in FIG. 7, step 650. After the results are stored, the content agent 620 creates a tree-shaped hierarchy in step 660. Once created, the tree-shaped hierarchy is stored in storage 630 at step 670.

Figure 8:
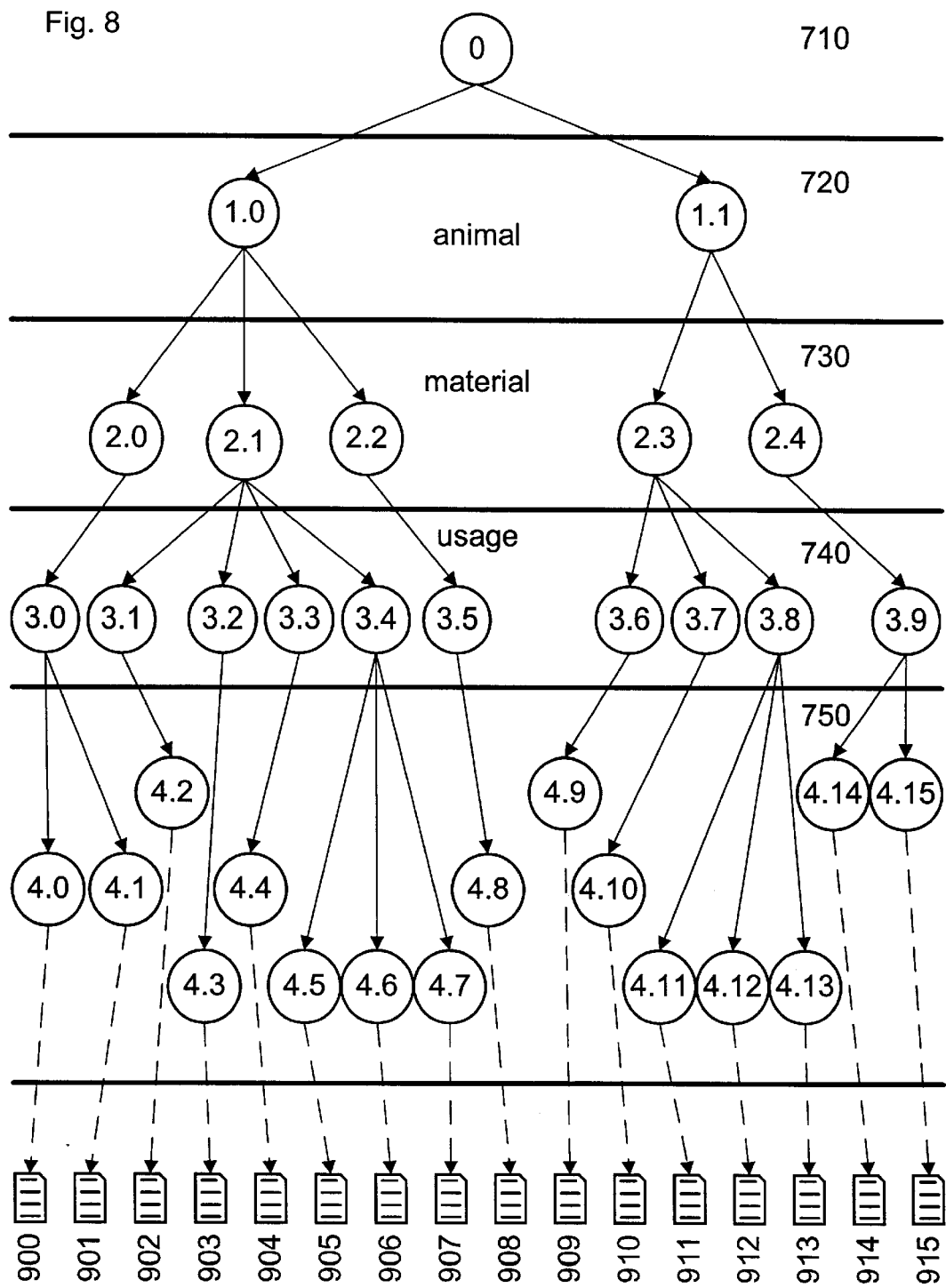
FIG. 8 shows a tree-shaped hierarchy according to an embodiment of the invention.

The tree shaped hierarchy for the results of the query shown in FIG. 2 is illustrated in FIG. 8.

It will be appreciated that, in FIG. 8, node 0 is a control node that represents the root of the tree shaped hierarchy, and also corresponds generally to the query created by the user (see FIG. 2). The leaf nodes 4.0–4.15 are references to the pages located during the search of the Web, namely hits 900–915. Of course, if a structured database was also being included in the search, the leaf nodes could include references to database records. Here, however, the exemplary embodiment of the invention is being described (for the sake of simplicity) as if only the Web was being searched.

Tree Shaped Hierarchy

In FIG. 8, reference numeral 710 refers to a root-node level of the tree-shaped hierarchy. A first level of the tree-shaped hierarchy is indicated by reference numeral 720. Reference numeral 730 refers to a second level of the tree-shaped hierarchy; reference numeral 740 to a third level, and reference numeral 750 to a fourth level. In the particular example, the fourth level is the lowest level.

For the sake of clarity, other terminology will now be briefly discussed.

Between the root node 0 and the leaf nodes 4.0–4.15 are intermediate nodes 1.0, 1.1, 2.0–2.4, and 3.0–3.9. The tree shown in FIG. 8 may be thought of as having an "up" direction when moving from the leaf nodes to the root node. Likewise, the tree shown in FIG. 8 may be thought of as having a "down" direction when moving from the root node to the leaf nodes. The level 750 is lower than levels 710–740, and the level 710 is higher than the other levels.

For a given node, such as node 2.1, the node immediately upward is the first node that is reached when traveling in the up direction (in the case of node 2.1, the node immediately upward is node 1.0.). For a given node, the set of nodes immediately downward is all the nodes that can be first reached when traveling in the down direction. Thus, for node 2.1, the set of nodes immediately downward is nodes 3.1–3.4. The terms "up" and "down" may also be used substantially interchangeably with "higher" and "lower", respectively.

Node 1.0 represents branches of the tree relating to the value of "ostrich" in the category "animal". Node 1.1 represents the branches that relate to the value of "eagle" in the category "animal."

Referring back to Table 1, it will be appreciated that hits 900–908 included content relating to "ostrich", and so these hits will be accessible in the tree-shaped hierarchy by traversing through node 1.0. Hits 909–915 did not relate to "ostrich" and so do not appear under node 1.0. They did relate, however, to "eagle" and are accessible under node 1.1.

The values indicated for the heaviest weighted category, "animal," thus become a way for semantically apportioning hits 900–915 at a highest level (which also may be referred to as a highest layer).

Node 2.0 represents the value of "feather" in the category "material". Nodes 2.1 and 2.2 represent "quill" and "plume", respectively. Nodes 2.0–2.2 are under node 1.0, and therefore also relate to an animal that is an ostrich. Nodes 2.3 and 2.4 represent "feather" and "quill" under node 1.1, and therefore also relate to an animal that is an eagle. The values for the second most heavily weighted category thus provide a way for semantically apportioning hits 900–915 at a second highest level.

Hits 900 and 901 included content relating to "feather" and also to "ostrich", and therefore are accessible through node 2.0; hits 902–907 included content relating to "quill" and also to "ostrich", and therefore are accessible through node 2.1; hit 908 included content relating to "plume" and "ostrich", and therefore falls under node 2.2. Hits 909–913 included content relating to "feather" and "eagle", and thus come under node 2.3; hits 914 and 915 included content relating to "quill" and "eagle", and are accessible through node 2.4. No hits with the content "plume" and "eagle" were returned, and so there is no node at level 730 that relates to a plume of an eagle.

In like fashion, node 3.0 relates to ostrich-feather-ornament. No hits had content relating to ostrich and feather and decoration, so no such node is included in the tree-shaped hierarchy.

For the sake of completeness, it will be noted that node 3.1 relates to ostrich-quill-decoration; node 3.2 to ostrich-quill-ornament; node 3.3 to ostrich-quill-adornment; node 3.4 to ostrich-quill-embellishment; node 3.5 to ostrich-plume-decoration; node 3.6 to eagle-feather-ornament; node 3.7 to eagle-feather-decoration; node 3.8 to eagle-feather-adornment; and node 3.9 to eagle-quill-ornament. The values for the third most heavily weighted category thus provide a way for semantically apportioning the hitlist at a third highest level.

Thus, the values within each category become intermediate nodes in a set of ordered layers of intermediate nodes. The order is set by the weighting of the categories. The most heavily weighted category is the one with the intermediate nodes in closest proximity to the root node.

The leaf nodes correspond to the results. Each leaf node may be thought of as having an upward set of intermediate nodes that define the leaf node's semantic relationship to the tree. This upward set of intermediate nodes is the set of nodes through which there is a path from the leaf node to the root node. In FIG. 8, e.g., the upward set of intermediate nodes for leaf node 4.6 includes intermediate nodes 3.4, 2.1, and 1.0. Intermediate node 3.4 relates to the value "embellishment"; node 2.1 relates to the value "quill", and node 1.0 relates to the value "ostrich". Because the nodes in the upward set of intermediate nodes of a given leaf node each relate to a value within a category, this gives the position of the leaf node a semantic significance within the tree-shaped hierarchy.

Uptree

Figure 11A:
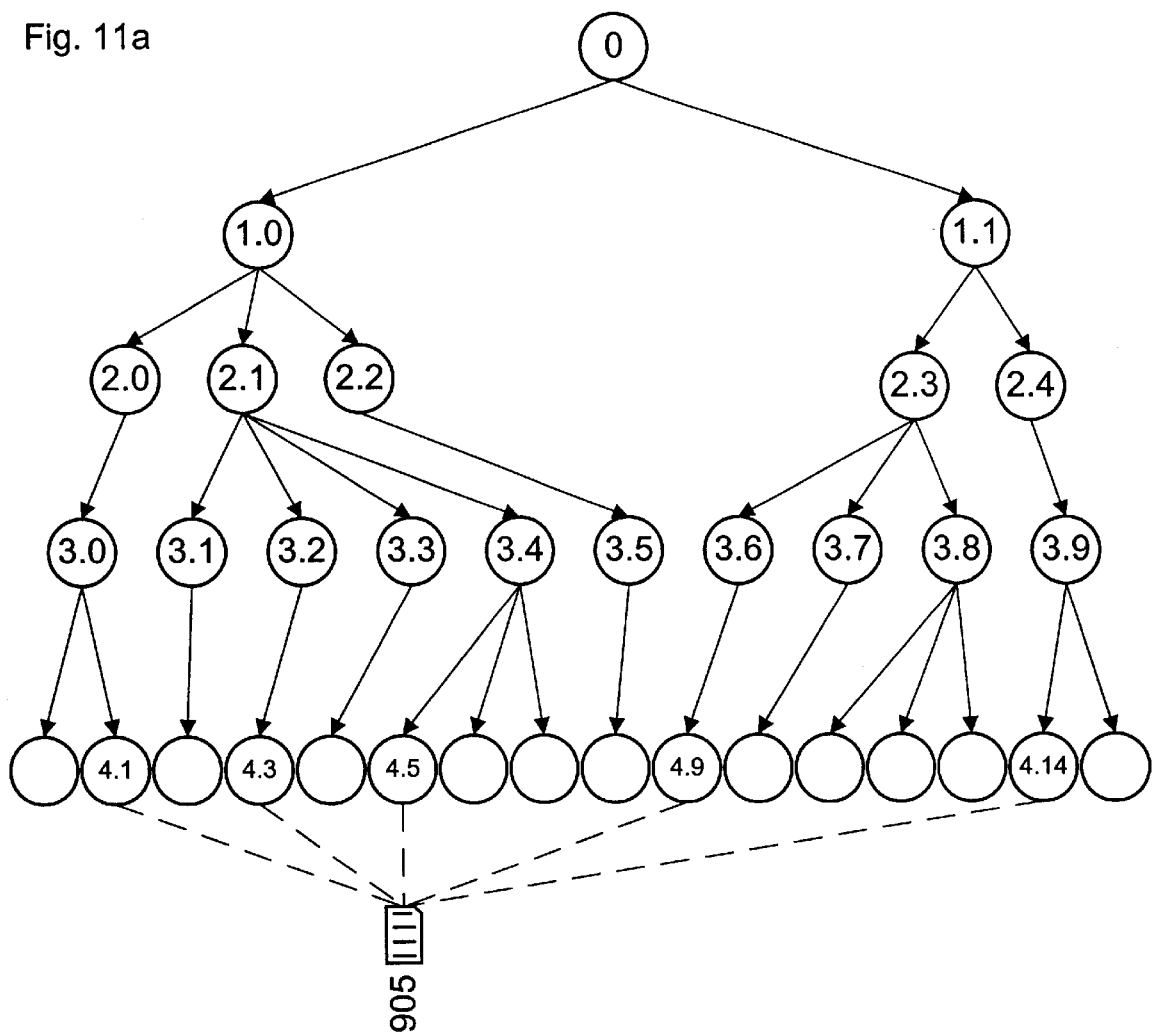
FIGS. 11a and 11b show tree-shaped hierarchy diagrams for illustrating the concept of the uptree of a leaf node.

FIG. 11a shows a tree shaped hierarchy similar to that of FIG. 8, but slightly different in that the nodes 4.1, 4.3, 4.5, 4.9, and 4.14 all refer to the same Web page (i.e., the same hit) 905. This situation might occur when the results retrieved are as shown in the following table. Note that hit 905 includes content relevant to more than one of the two values entered by the user for the categories animal, material, and usage. Hit 905 is relevant along more than one path through the tree-shaped hierarchy.

TABLE 2

| Result | Information |
| --- | --- |
| 900 | ostrich, feather, ornament |
| 902 | ostrich, quill, decoration |
| 904 | ostrich, quill, adornment |
| 905 | ostrich, eagle, quill, feather, ornament, embellishment |
| 906 | ostrich, quill, embellishment |
| 907 | ostrich, quill, embellishment |
| 908 | ostrich, plume, decoration |
| 910 | eagle, feather, decoration |
| 911 | eagle, feather, adornment |
| 912 | eagle, feather, adornment |
| 913 | eagle, feather, adornment |
| 915 | eagle, quill, ornament |

In FIG. 11*a*, more than one leaf node relates to hit 905, and so the leaf nodes 4.1, 4.3, 4.5, 4.9, and 4.14 all resolve ultimately to the Web page (or database record) 905. Thus, each of these nodes might be thought of as being substantially identical in terms of their ultimate resolution when moving downward.

It will be appreciated, however, that since the five nodes just mentioned all resolve to the same Web page 905, they define a set of analytically acceptable paths which might be taken when going back from Web page 905 up into the tree shaped hierarchy.

Furthermore, it would be analytically appropriate to move upward from Web page 905 through any of the nodes 3.0, 3.2, 3.4, 3.6, or 3.9. In a sense, therefore, any of the nodes 4.1, 4.5, 4.9, and 4.14 might be thought of, in a conceptual sense, as being logically linked with the nodes 3.0, 3.2, 3.4, 3.6, or 3.9. This logical linkage forms an important concept in the navigation of the virtual space defined by the tree shaped hierarchy. In particular, this concept is the concept of the "uptree".

Figure 10:
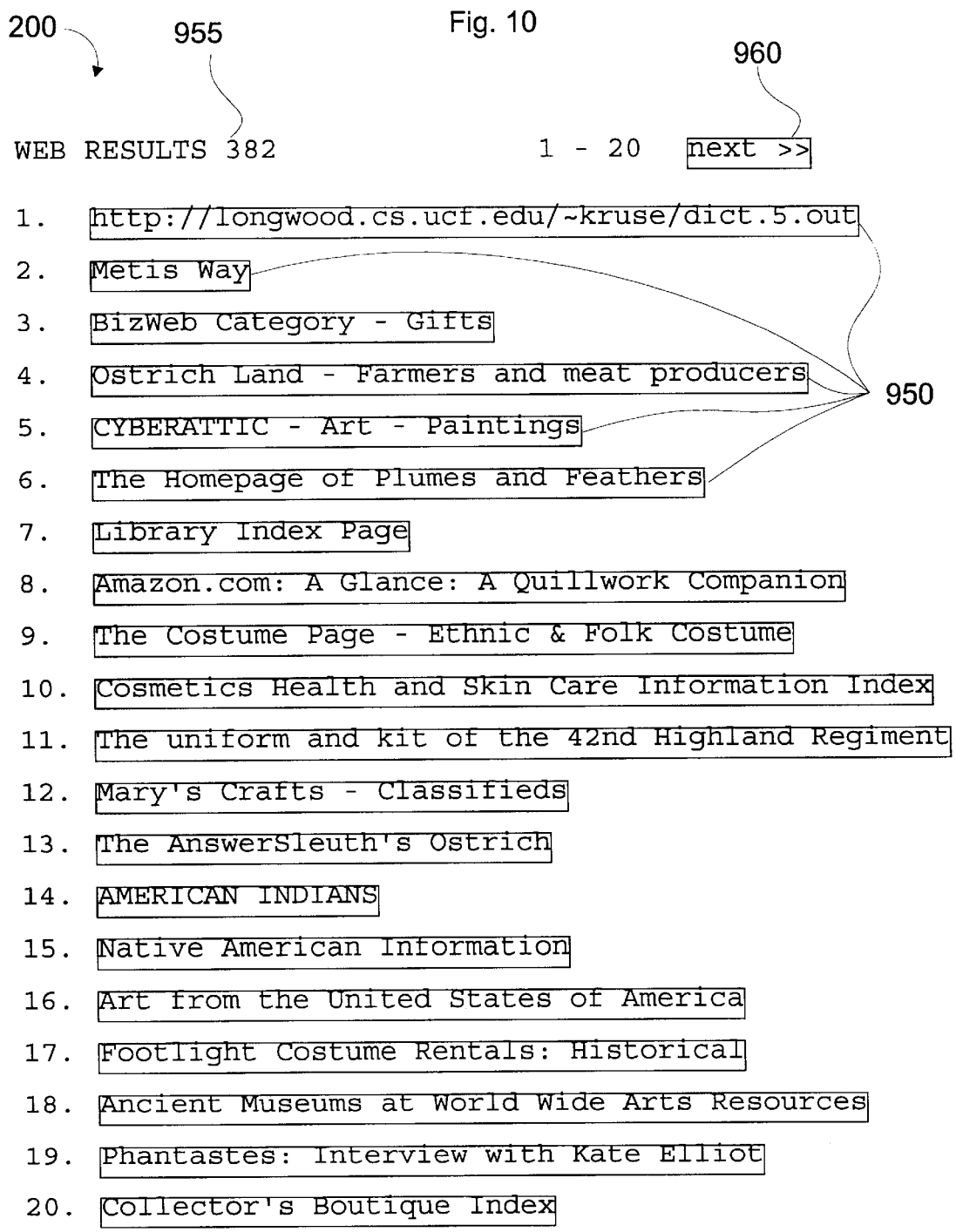
FIG. 10 shows how query results are conventionally presented.
Figure 11B:
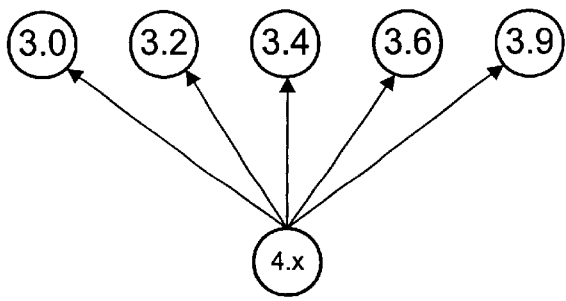

FIG. 11*b* shows the uptree that is logically appropriate for any of the nodes 4.1, 4.3, 4.5, 4.9, and 4.14 by virtue of the fact that all of these nodes reference the same Web page 905. It may be said that these nodes, from the vantage point of only result 905, have an isolated semantic identity at that result. Because of this isolated semantic identity of the nodes 4.1, 4.3, 4.5, 4.9, and 4.14, all of these nodes are represented by node 4.x in FIG. 10*b*. Result 905 may be referred to as a point of isolated semantic identity.

Figure 12A:
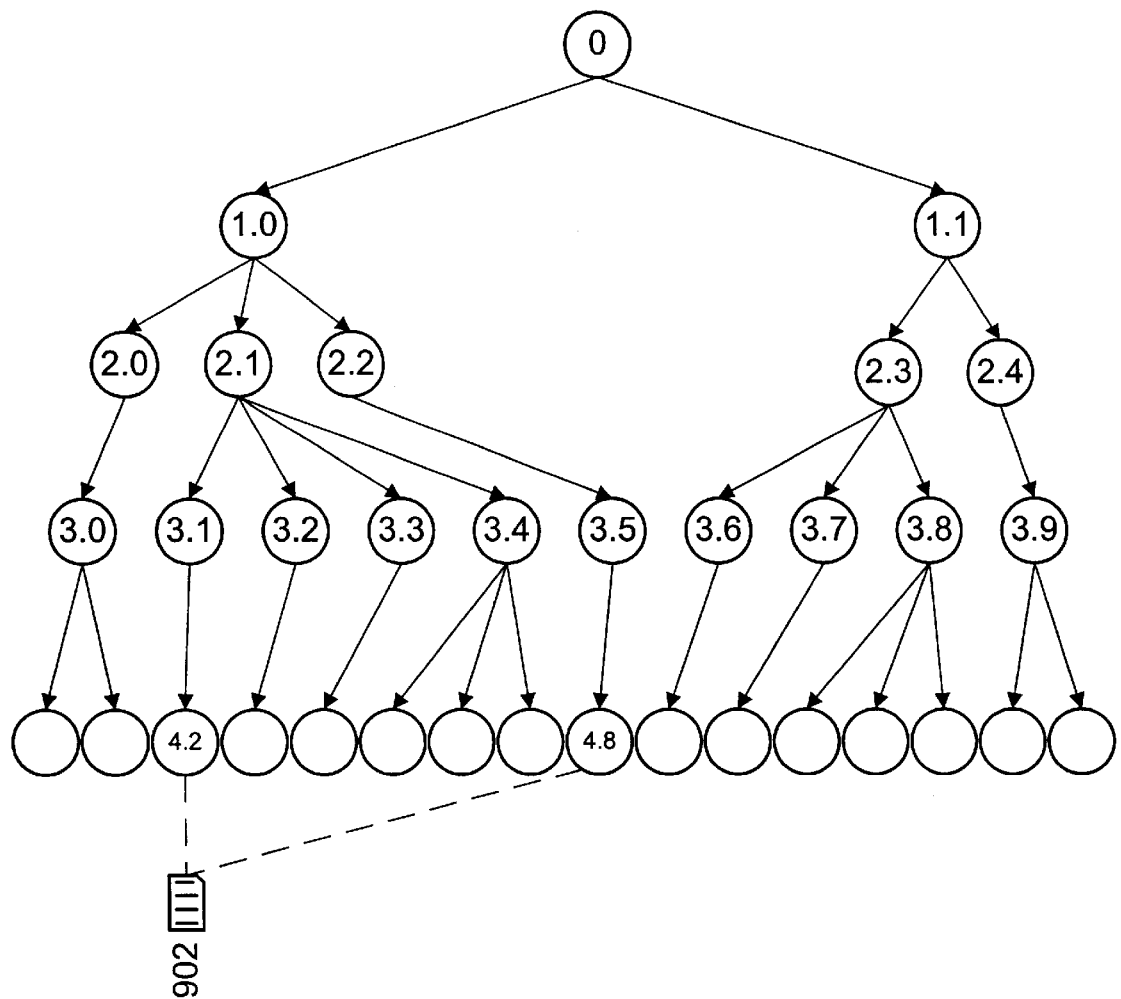
FIGS. 12a and 12b show tree-shaped hierarchy diagrams for illustrating the concept of the uptree from an intermediate node.

FIG. 12*a* is similar to FIG. 10*a*, except that leaf nodes 4.2 and 4.8 both refer to Web page 902. The tree-shaped hierarchy shown in FIG. 12*a* could result from results as shown in the following table.

TABLE 3

| Result | Information |
| --- | --- |
| 900 | ostrich, feather, ornament |
| 901 | ostrich, feather, ornament |
| 902 | ostrich, quill, plume, decoration |
| 903 | ostrich, quill, ornament |
| 904 | ostrich, quill, adornment |
| 905 | ostrich, quill, embellishment |
| 906 | ostrich, quill, embellishment |
| 907 | ostrich, quill, embellishment |
| 909 | eagle, feather, ornament |
| 910 | eagle, feather, decoration |
| 911 | eagle, feather, adornment |
| 912 | eagle, feather, adornment |
| 913 | eagle, feather, adornment |
| 914 | eagle, quill, ornament |
| 915 | eagle, quill, ornament |

Figure 12B:
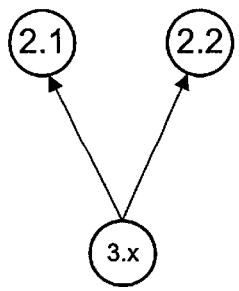

It should be noted that in FIG. 12*a* nodes 3.1 and 3.5 may be considered to have a logical commonality in that they both have only one other node immediately downward, and in both cases the node immediately downward refers to identical Web page 902. In view of this logical commonality, it is analytically appropriate for navigation upward from either of nodes 3.1 or 3.5 to progress to either node 2.1 or node 2.2. This situation is represented in FIG. 12*b*. Nodes 3.3 and 3.6 are represented by node 3.x in FIG. 12*b*, and the nodes 2.1 and 2.3 represent the analytically appropriate uptree from node 3.x.

This example shows that an uptree with more than one branch is possible even from nodes that are intermediate nodes. Points of isolated semantic identity can occur anywhere in the tree-shaped hierarchy.

Database Access

Figure 9:
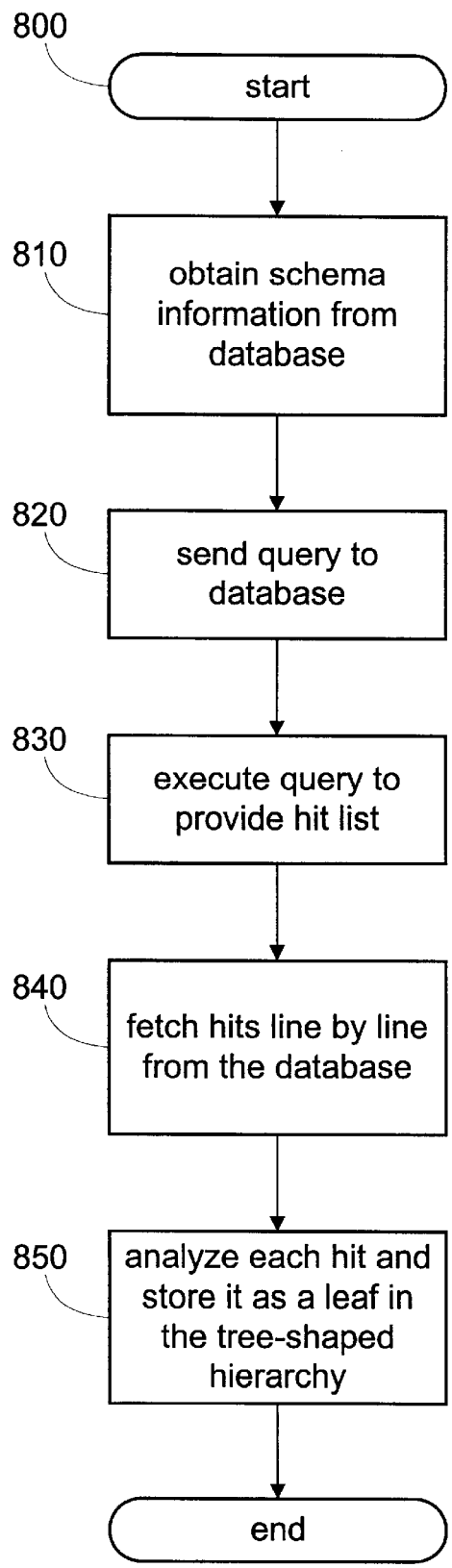
FIG. 9 shows a flow diagram of a retrieval operation for a structured database.

As shown in FIG. 9, a system operating according to the invention is able to retrieve data not from only the Internet and Web sites, but also from structured databases such as database 450 shown in FIG. 4. It will be understood, however, that access to a structured database typically requires some for knowledge of the location of the database, and prearranged access permission for a user to access a database.

In FIG. 9, step 810 involves the step of obtaining schema information from the database 450. Using the schema information, the network agent 640 can take the query received from the content agent 620 and generate the appropriate corresponding statements in a query definition language. It is not essential that the network agent 640 creates the statements in the query definition language. A separate agent could be made to accomplish this, or it could be done by the content agent 620. The exact implementation, of course, depends on the design goals for the system.

In step 820, the network agent sends the query to the database management system controlling database 450. The query is executed upon database 450 in step 830 to provide a query results which corresponds to a hit list. In step 840, the "hits" are fetched, line by line, from the database back to the network agent 640.

The results are passed on to the content agent 620, which analyzes each result (i.e., each hit) and stores it as a leaf in the tree-shaped hierarchy.

When more than one database is available, the different database servers are conceptually viewed as access points. Each access point is responsible for analyzing the query provided to it from the network agent 640, and creating an appropriate set of results constituting a respective hit list. The access points might each return not just the hit list, but also an indication of the number of hits.

When the results are returned to the search application server 420, it is considered advantageous for the results to be in a particular format that conveys at least certain information. The reason for this is that the results from the structured database 450 and the results from the website 470 need to be handled together and presented to the user with a common and, hopefully, seamless interface. The user should not be burdened with having to sift through the data two times— once for the data from unstructured databases and once for the data from structured databases.

More particularly, it is advantageous for the data to be provided to the search application server 420 so that, for each line fetched from the structured database 450, there is a designation of the access point from which the information is supplied, a URL that indicates the unique server (i.e., the database server 440), the service that is able to procure and represent the data, the query arguments, and the search words that led to the selection of the particular line. Providing this information makes it possible to treat the results from a structured database in the same fashion as results from a website, and still allow the user to easily later navigate to the record later when desired.

There are also some considerations necessary when retrieving information from an unstructured database, in particular the Internet World Wide Web. That is, it is important to have certain control parameters set to avoid overloading. Such control information might include a limit value for the quantity of pages to procure, a limit value for the maximum nesting depth of a recursive search process, and a list of URLs which should not be searched.

Presentation

The tree shaped hierarchy shown in FIG. 8 represents an important advance in the management of query result complexity, as will become apparent after considering the conventional method of showing query results.

FIG. 10 shows how query results are typically displayed. In window area 200, there is provided a volumetric indication 955 that shows the number of hits obtained by the search operation. The individual results are shown with links 950. In this example, 382 results were returned from a query, and the first 20 have been displayed in window area 200. A "next" button 960 is provided so that the next 20 results can be displayed.

Even though the presentation of the search results in FIG. 10 may be ordered by a relevance score (not shown), there is no way to determine whether an entry relates to ostrich or to eagle, to feather, quill, or plume, or others of the user parameters. The set of 382 results is thus ordered in only one manner, and nothing is done to manage the complexity of all of these results except for presentation in order of computed relevance.

According to an embodiment of the invention, the user is provided with a plurality of user activatable and display regions corresponding to the nodes of the tree-shaped hierarchy.

Figure 13:
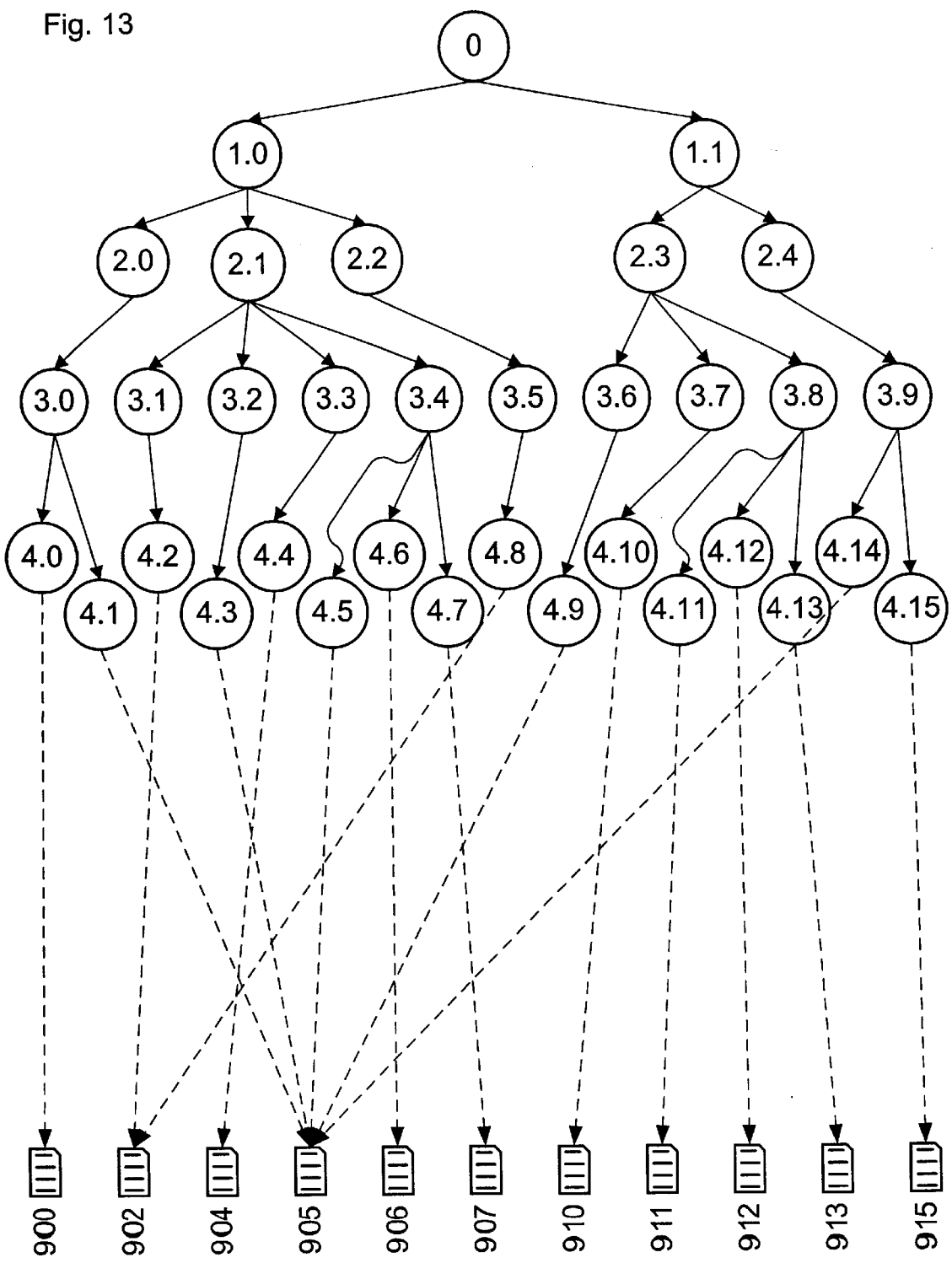
FIG. 13 shows a tree-shaped hierarchy of results used in explaining an operation according to one embodiment of the invention.

For the following example it will be assumed that the query results are as shown in the following table, with the corresponding tree-shaped hierarchy being as illustrated in FIG. 13.

TABLE 4

| Result | Information |
| --- | --- |
| 900 | ostrich, feather, ornament |
| 902 | ostrich, quill, plume, decoration |
| 904 | ostrich, quill, adornment |
| 905 | ostrich, eagle, quill, feather, ornament, embellishment |
| 906 | ostrich, quill, embellishment |
| 907 | ostrich, quill, embellishment |
| 910 | eagle, feather, decoration |
| 911 | eagle, feather, adornment |

TABLE 4-continued

| Result | Information |
| --- | --- |
| 912 | eagle, feather, adornment |
| 913 | eagle, feather, adornment |
| 915 | eagle, quill, ornament |

FIG. 13 is similar to FIG. 11a in that nodes 4.1, 4.3, 4.5, 4.9, and 4.14 all point to the same result or web page 905. FIG. 13 is similar to FIG. 12a in that nodes 4.2 and 4.8 both point to the same Web page 902. In all, 11 hits were included in the hit list.

Figure 14:
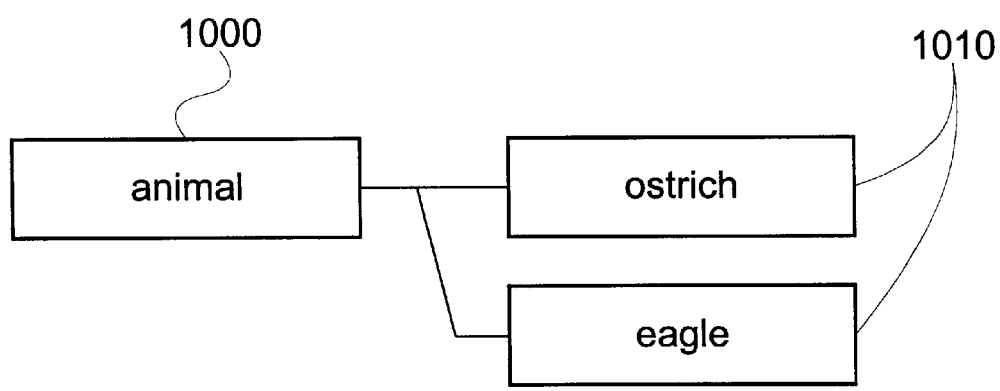
FIGS. 14–18 show an example of a manner of presenting results using a tree-shaped hierarchy.

In the following exemplary embodiment, part of the tree shaped hierarchy is shown to the user in the window area 200, as shown in FIG. 14. At this point, it is assumed that the query results have just been returned. The tree shaped hierarchy has been prepared, and the user is presented with the option of navigating the tree shaped hierarchy according to a particular value that corresponds to the most heavily weighted category. In the present example, the most heavily weighted category is "animal". In the window area 200, the most heavily weighted category may be displayed using the navigation path indicator 1000. Navigation path indicator 1000 is a display region, but could be used as a user activatable region for indicating a higher-level operation, such as entering a new set of user parameters.

The values that were entered by the user in the value entry regions 240 and corresponding to the category "animal" have become the set of nodes in the first level 720 of the tree shaped hierarchy. These nodes (i.e., nodes 1.0 and 1.1) are represented by the navigation branch indicators 1010. The navigation branch indicators 1010 are user activatable regions. Thus, the user is presented with the opportunity of selectively drilling down into the tree shaped hierarchy to explore the results pertaining to "ostrich" or "eagle". It is assumed, for the present discussion, that the user activates the navigation branch indicator 1010 corresponding to the value of "eagle" for the category of "animal".

Figure 15:
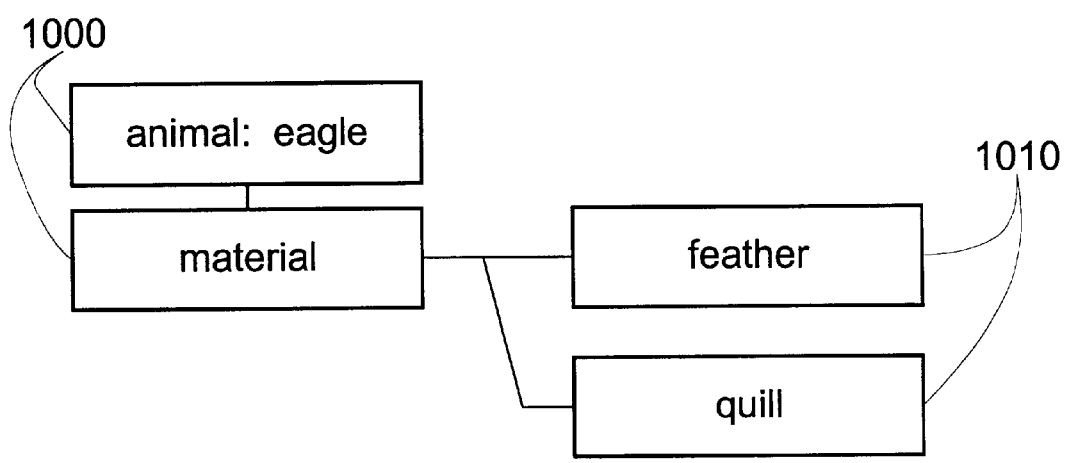

In FIG. 15, the navigation path indicators 1000 have been updated to reflect that, at the first level 720 of the tree-shaped hierarchy, the branch corresponding to animal=eagle was taken, and that now a decision is required as to which value for the category "material" is to be explored (i.e., which branch is to be taken at the second level 730 of the tree shaped hierarchy). In FIG. 15, the navigation branch indicators 1010 provide the user with the opportunity of selectively drilling down into the tree shaped hierarchy to explore the results pertaining to "feather" or "quill" within the set of results for which the animal is an eagle. These two navigation branch indicators 1010 correspond to the nodes 2.3 and 2.4 in the tree shaped hierarchy shown in FIG. 13. It is assumed, for the present discussion, that the user activates the navigation branch indicator 1010 corresponding to the value of "feather" for the category "material". This navigation operation involves a movement of the present focus of the user from node 2.3 to node 3.8.

Figure 16:
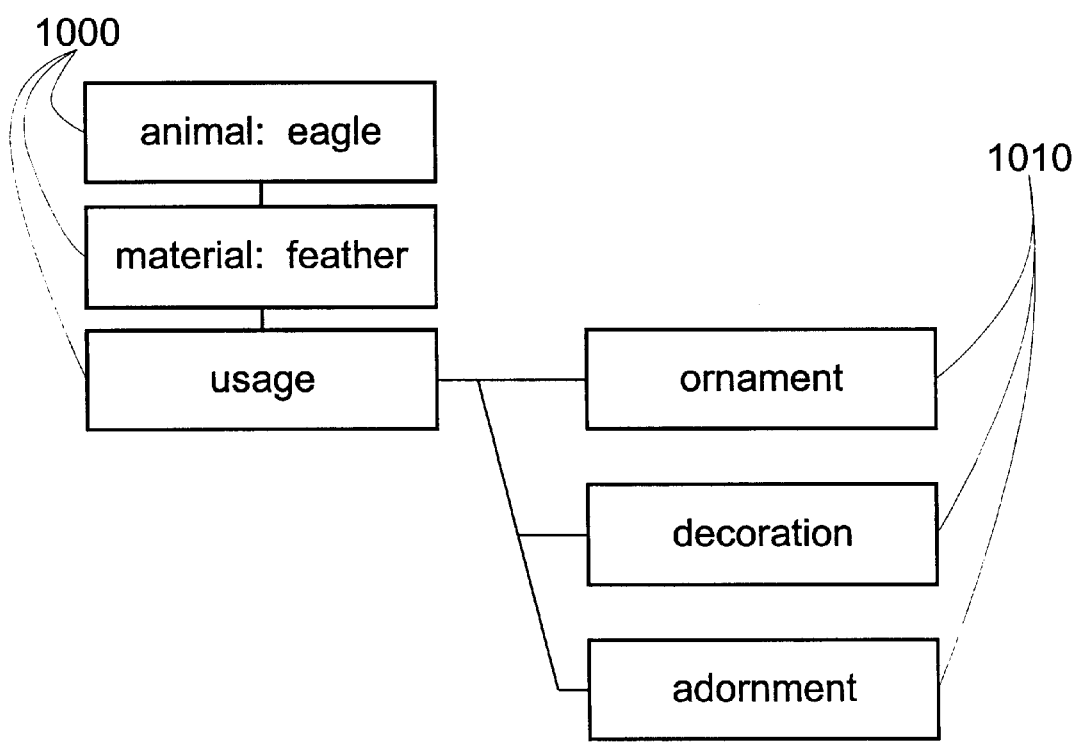

The result of such an operation is shown in FIG. 16. In FIG. 16, the navigation path indicators 1000 have been updated to reflect that, at the first level 720 of the tree shaped hierarchy, the branch corresponding to animal=eagle was taken, and that, at the second level 730 of the tree shaped hierarchy, the branch corresponding to material=feather was taken, and that now a decision is required as to which value for the category "usage" is to be explored (i.e., which branch is to be taken at the third level 740 of the tree shaped hierarchy). In FIG. 16, the navigation branch indicators 1010 provide the user with the opportunity of selectively drilling down into the tree shaped hierarchy to explore the results pertaining to "ornament" or "decoration" or "adornment" within the set of results for which the animal is an eagle and the material is a feather. These three navigation branch indicators 1010 correspond to nodes 3.6, 3.7, and 3.8. For the sake of the present discussion, it is assumed that the user selects "adornment".

Figure 17:
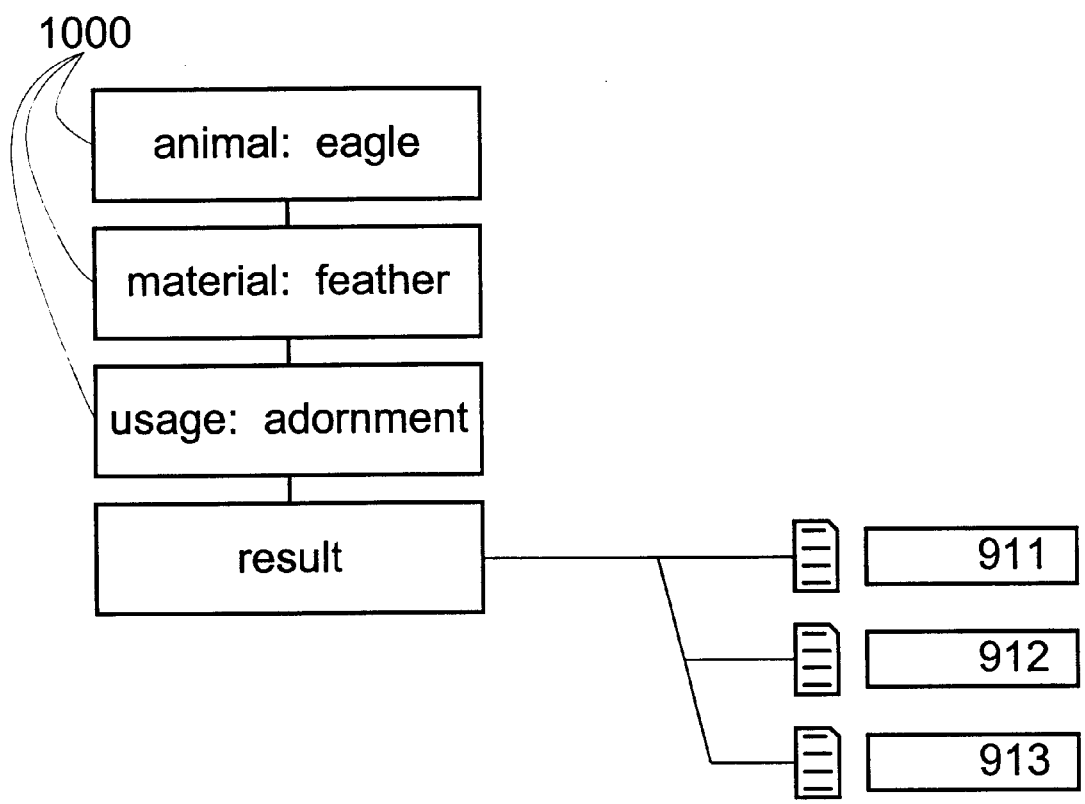

The result of such an operation is shown in FIG. 17. In FIG. 17, the navigation path indicators 1000 have been updated to reflect that, at the first level 720 of the tree shaped hierarchy the branch corresponding to animal=eagle was taken, at the second level 730 of the tree shaped hierarchy the branch corresponding to material=feather was taken, and at the third level 740 of the tree shaped hierarchy the branch corresponding to usage=adornment was taken. Now, a choice as to the particular result to explore is required. In FIG. 17, the navigation branch indicators are shaped differently because the nodes below node 3.8, to which the user has navigated by selecting "adornment", are leaf nodes. The navigation branch indicators display some information about the particular result (in this simplified example, the result numbers 911, 912, or 913). These three navigation branch indicators actually correspond to nodes 4.11, 4.12, and 4.13, respectively.

Figure 18:
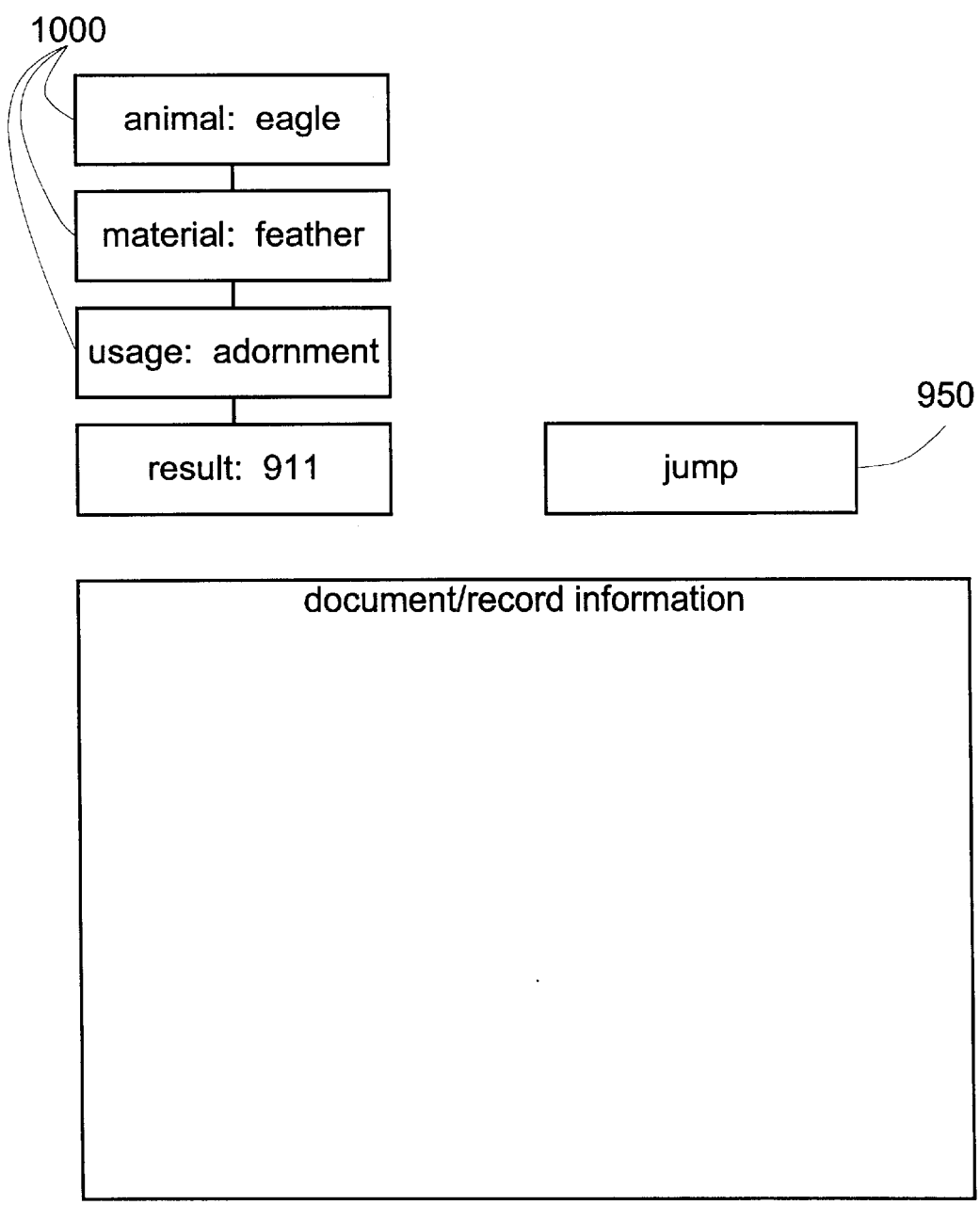

FIG. 18 shows the result when the user activates the navigation branch indicator for result 911. The navigation path indicators are updated to reflect previous navigation choices. Some document or record information is displayed in a display region below, and a link 950 is provided whereby a user may actually access the page 911 on web server 460 (or the record in structured database 450 via server 440, if appropriate).

The creation of the tree shaped hierarchy with levels corresponding to the weighted categories provided by the user in category entry regions 210 (and weighted using the slider bars 230 of the weighting regions 220), and with the nodes within the levels corresponding to values provided by the user in the value entry regions 240 provides the user the opportunity to review results 900–915 selectively. The advantage of this approach becomes more apparent when consideration is given to a situation in which a query retrieves hundreds or thousands of hits.

The leaf nodes represented in FIG. 17 could be ordered according to a relevance score. Where the results were too numerous to display on one screen, a "next" button (such as button 960 in FIG. 10) could be provided. Also, a volumetric indicator 955 (see FIG. 10) may be provided.

It will be understood that the tree-shaped hierarchy is the focus of this discussion, and the ability it gives to present results to a user in a way that helps manage the complexity of the hitlist (i.e., the set of hits or results). The actual generation of the tree shaped hierarchy is within the level of skill of one in the art and can be achieved using pointers in linked lists, object aggregations, or a database approach.

It will also be appreciated that the exact form of presenting the query results using the tree-shaped hierarchy also is not the focus of this discussion (although it is the focus of the above-identified co-pending applications), and many variations to the interface that has been presented will be possible without departing from the spirit and scope of the invention.

Finally, it will be appreciated that the presentation of the tree-shaped hierarchy may be thought of as a restricted presentation of the query results since not all of the hits in the hitlist are immediately available directly after the query, but a navigation through an intermediate node (and possibly a plurality of intermediate nodes) is first required.

A particularly advantageous form of presentation is described in the application entitled "PRESENTATION OF HIERARCHICAL QUERY RESULT DATA USING MULTIPLE DEGREES OF FREEDOM" and mentioned on page 1.

Presentation with uptree display

FIGS. 19–22 show the operation of the invention according to another embodiment. According to this embodiment of the invention, uptree information is displayed. In this discussion, the tree-shaped hierarchy as shown in FIG. 13 is used again.

In the beginning, the user may be presented with the choice of drilling down to any of the nodes (1.0 or 1.1) of the first level 720. The position of the user is at the origin, root node 0.0. The interface presented to the user may be as shown in FIG. 14. For the purposes of this discussion, it may be assumed that the user selects "ostrich" for further exploration. The result of such an operation according to this embodiment of the invention is shown in FIG. 19.

Figure 19:
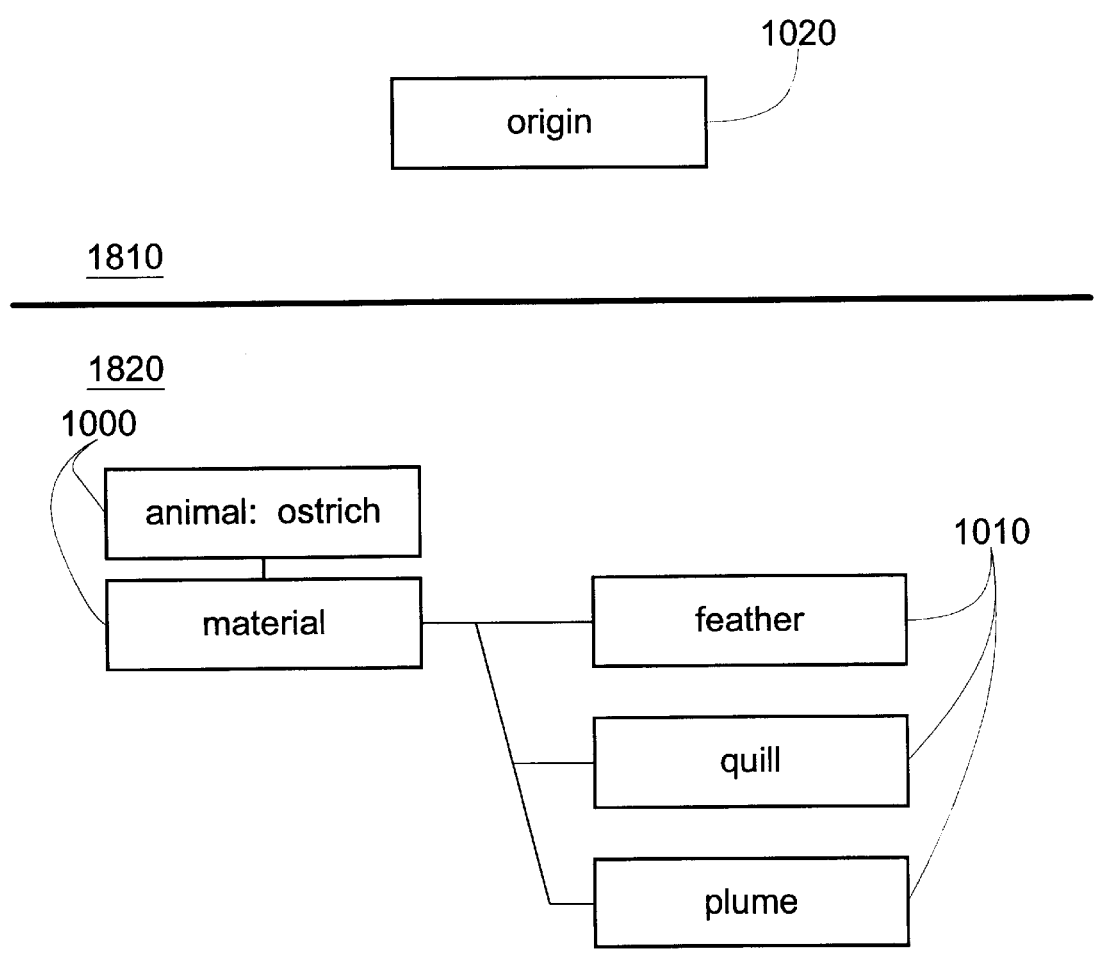
FIGS. 19–22 show an example of presenting results using a tree-shaped hierarchy with uptree information.

In FIG. 19, the window area 200 is divided into an upward region 1810 and a downward region 1820. The line separating the upward and downward regions represents the user's present location. The upward region 1810 represents the logically appropriate upward navigation paths, and the downward region 1820 represents the available downward or "drill-down" navigation paths.

FIG. 19 shows that the user is at a position in the tree at which animal=ostrich has been selected, and that a decision is now required as to which value in the category "material" is to be explored in the downward direction via navigation branch indicators 1010. This position corresponds to node 1.0.

Figure 20:
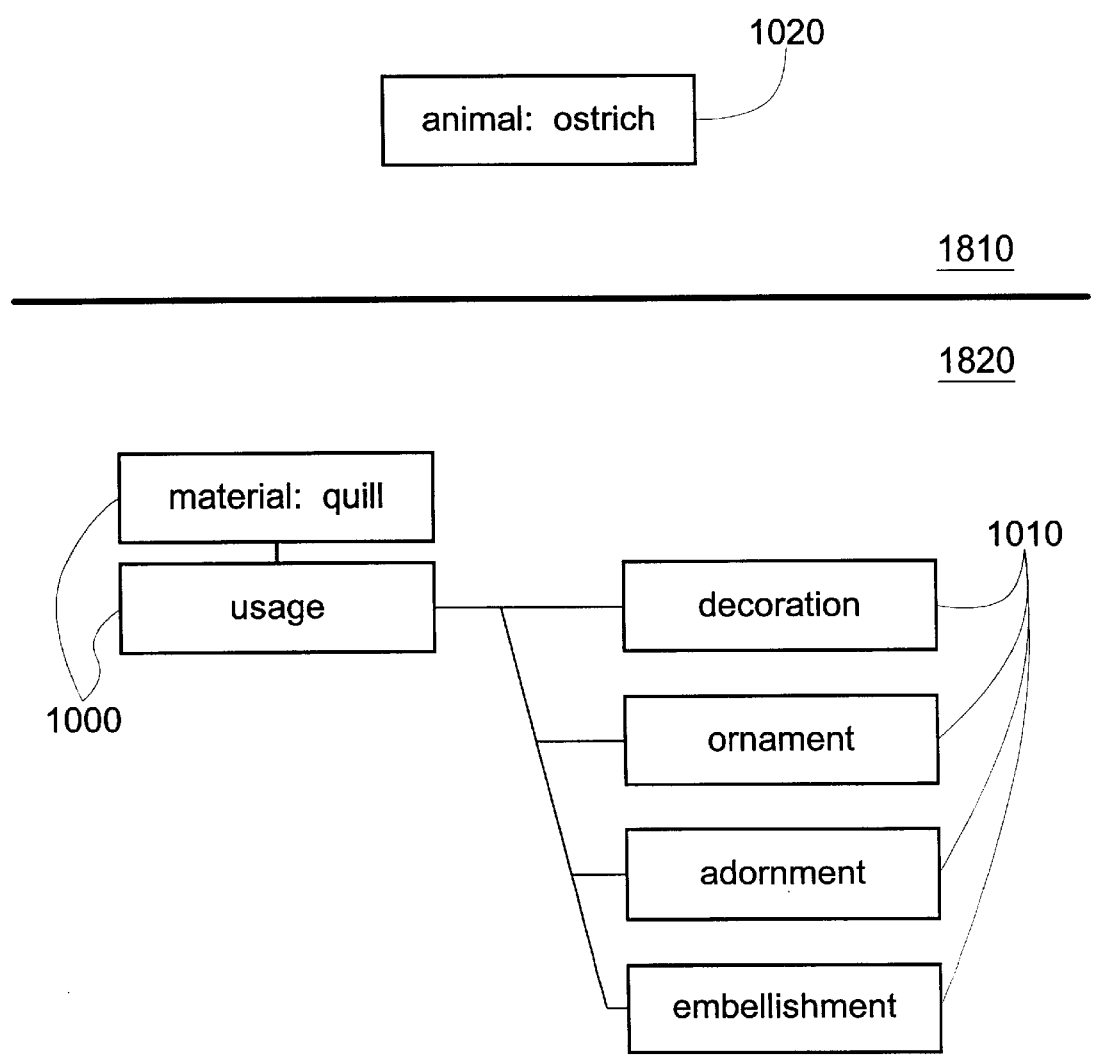

If the user activates the user activatable region for "quill", the result is as shown in FIG. 20. In FIG. 20, the downward region 1820 includes a navigation path indicator 1000 that shows the present position to be the location in the tree in which material=quill. The upward region 1810 reveals that this position is relative to the upward branches in which animal=ostrich, as shown in uptree indicator 1020. The navigation branch indicators 1010 in the downward region 1820 show that a choice must be mode for which value should be explored for the category "usage".

Figure 21:
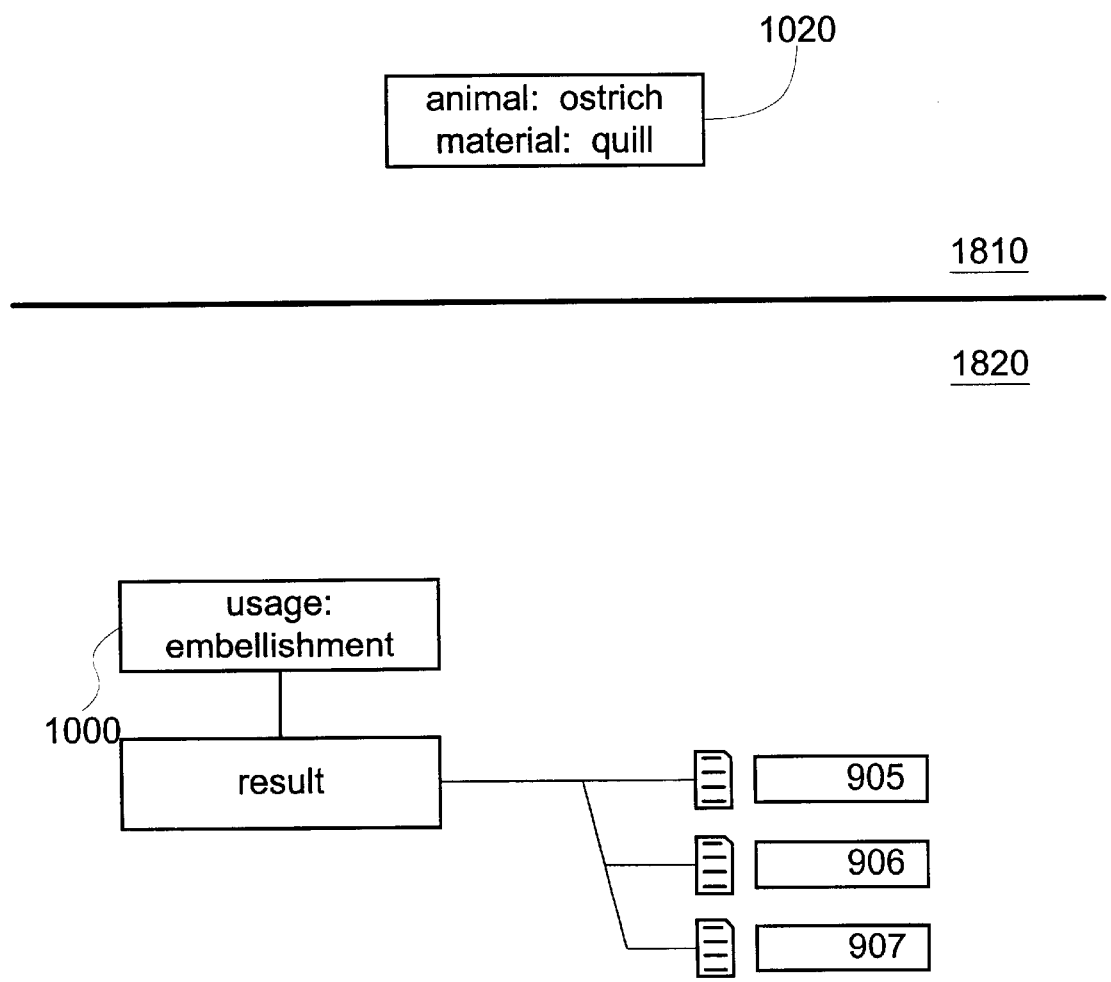

If the user selects embellishment, the result is as shown in FIG. 21. In FIG. 21, the uptree indicator 1020 has been changed to show that the present location is relative to the context of animal=ostrich and material=quill. The present location where usage=embellishment, as shown in the downward region 1820. A selection between three results may now be made.

Figure 22:
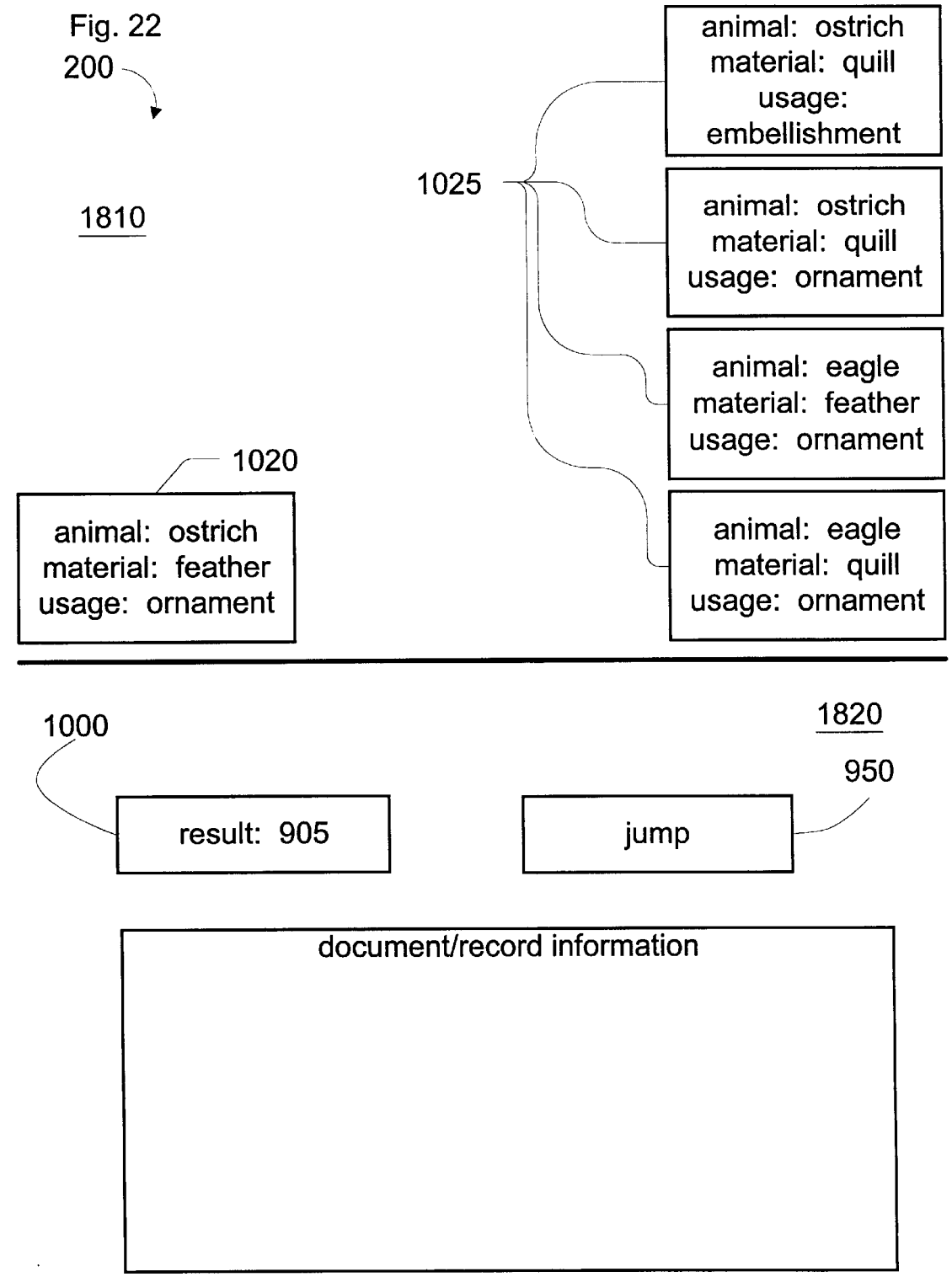

FIG. 22 shows the result when the user selects result 905. The position of the user in the tree of FIG. 13 is at node 4.5. In FIG. 22, the downward region 1820 shows that the present location is at result=905. A link 950 is provided whereby the user may actually open up the Web page (or access the record, if the hit is from a structured database). Document or record information from or about result 905 may be displayed in the downward region 1820.

The upward region 1810 includes the uptree indicator 1020 showing the position in the tree immediately up from the present location. The upward region 1810 also includes several supplemental uptree indicators 1025 showing other logically appropriate upward paths from the present location.

The uptree indicator 1020 corresponds to node 3.4. The supplemental uptree indicators 1025 correspond to nodes 3.0, 3.2, 3.6, and 3.9. These supplemental uptree indicators 1025 were selected because, as shown already in FIGS. 11*a* and 11*b*, these nodes are logical uptree nodes from the nodes, such as node 4.5, that point to result 905. Result 905, it will be recalled, is a point of isolated semantic identity. Navigating to any of nodes 4.1, 4.3, 4.5, 4.9, and 4.14 would thus normally result in the display of such supplemental uptree indicators 1025. Activating any uptree indicator 1020 or 1025 may result in the movement of the user's position to the corresponding node, with the updating of all of the display regions being done accordingly.

Navigating to node 4.2 (or 4.8) would result in uptree indicators for nodes 3.1 and 3.5 being displayed in the upward region 1810 (see FIGS. 12*a* and 12*b*). Likewise, navigating to node 3.1 (or 3.5) would result in uptree indicators for nodes 2.1 and 2.2.

By providing the uptree indicators as in FIG. 22, the complexity of query results is managed even better than in the embodiment that does not use uptree indicators. In particular, the user now can navigate through the query results in a manner that weaves together strands within the tree that have this logical commonality at points of isolated semantic identity. Similarities between the results among different categories and values can be noted and navigation to such similar results is facilitated.

Navigation across branches is thus provided in a semantically reasonable manner, based on the semantics provided by the user during the entry of user parameters. From node 4.5, therefore, the user could navigate upward to node 3.9. Uptree navigation through supplemental uptree indicators 1025 thus provides for the navigation to a logically upward node (such as node 3.9) that is other than the immediately upward node (i.e., node 3.4) of the present node (i.e., node 4.5).

It is possible to determine all possible uptree indicators for every node of the tree prior to the user's first navigation operation, or as the user moves from node to node.

Implementation Options

It is possible to implement the above-identified system by providing a presentation agent at the user terminal 430. In such an arrangement, the content agent 620 could provide information concerning the tree-shaped hierarchy to the user agent 610, which would provide such information to the presentation agent at the user terminal 430. Such information may be understood to include node information relating to the nodes of the tree-shaped hierarchy. The node information includes a node type indicator (i.e., root, intermediate, leaf); an upward node indicator; at least one downward indicator; and a category/value indicator. For the embodiment having uptree capabilities, uptree information may be included.

The node information may be sent on a node-by-node basis in a simple data structure from the user agent 610 to the presentation agent, or may be sent all at once in a more complex data structure. The structure with the node information may also be an object, such as a node object. It is preferable from a resource standpoint to use the node-by-node approach because this takes less memory and display space at the presentation agent and thus useable in relatively small devices.

In any of these cases, it will be understood that the node information is provided by the search application server to the user terminal as a signal with signal components representing the different indicators in the node information.

It may also be said that the node information is included in a carrier wave sent from the server to the terminal.

It is possible to provide certain functions of the user agent, the content agent, or the network agent in other, distinct objects as befits the particular needs of the system being implemented. It will be appreciated that all of these functions could likewise be implemented in a single program or object, without departing from the spirit and scope of the invention, which is to be interpreted in accordance with the appended claims.

It is also foreseen that the content agent, network agent, and user agent may be provided not as objects, but only described in an object oriented class hierarchy that defines the function of the objects so that, when such an object is created, it has the desired functionality.

There is claimed:

1. A search support method, comprising:

displaying on a user terminal a user interface with a plurality of user activatable regions including category entry regions, weighting regions, and value entry regions;

receiving at a search application server a set of user parameters from said plurality of user activatable regions including a plurality of categories, each having one or more respective values, wherein at least one of said categories has at least two said respective values, and wherein each of said plurality of categories has a respective weight, and wherein said set of user parameters is received by a user agent object of a search support application on said search application server;

providing said set of user parameters from said user agent object to a content agent object of said search support application;

building a query at said content agent object based on said set of user parameters, wherein said query includes a logical OR operation for each of said respective values within one of said plurality of categories to produce a respective first logical term, and a logical AND operation with each said first logical term for all of said plurality of categories;

providing said query from said content agent object to a network agent object of said search support application;

sending said query, using said network agent object, to one or more search engines;

receiving query results at said network agent object from said one or more search engines or databases;

providing said query results from said network agent object to said content agent object;

storing said query results in a data storage of said search application server;

creating a tree-shaped hierarchy, using said content agent object, wherein:

said tree-shaped hierarchy has a root node representing said query;

said tree-shaped hierarchy has a plurality of ordered levels of intermediate nodes, each of said ordered levels corresponding to one of said plurality of categories, wherein the order of said levels of intermediate nodes in proximity to said root node is determined based on said respective weight of said corresponding one of said plurality of categories, and wherein said intermediate nodes for a heaviest weighted one of said plurality of categories are connected to said root node;

said intermediate nodes at each given one of said plurality of ordered levels corresponding to said respective values for said one of said plurality of categories to which said given one of said ordered levels corresponds;

said tree-shaped hierarchy having leaf nodes connected to said intermediate nodes, each of said leaf nodes corresponding to one of said query results, each of said leaf nodes having an upward path through an upward set of said intermediate nodes to said root node, wherein said one of said query results pertains to all of the respective values in each of said intermediate nodes of said upward set of intermediate nodes; and presenting at said user terminal a user interface based on said tree-shaped hierarchy, including:
- displaying a navigation path indicator representing a position with respect to a present node of said tree-shaped hierarchy;
- displaying a plurality of navigation branch indicators for selecting corresponding ones of said nodes in said tree-shaped hierarchy connected to said present node, each being displayed using ones of said corresponding values; and
- when said present node is one of said plurality of intermediate nodes corresponding to a lowest level of said plurality of ordered levels, displaying one or more activatable display regions corresponding to ones of said leaf nodes connected to said present node.

2. The search support method as set forth in claim 1, further comprising:

after creating said tree-shaped hierarchy, determining an uptree of intermediate nodes for ones of said leaf nodes having an identical one of said query results;

when said present node is one of said leaf nodes having said uptree of intermediate nodes, displaying a corresponding uptree indicator for each of said intermediate nodes of said uptree; and displaying, for each said uptree indicator, said values for said corresponding upward set of intermediate nodes.

3. A search support method, comprising:

sending to a search engine a query based on user parameters including categories, category weights, and values corresponding to said categories;

receiving query results;

creating a tree-shaped hierarchy having a root node and leaf nodes, each said leaf node having a corresponding one of said query results, said tree-shaped hierarchy having ordered layers of intermediate nodes between said root node and said leaf nodes, said ordered layers including at least a first and a last layer, wherein:
- said first layer of said intermediate nodes is immediately downward of said root node and represents said values corresponding to the one of said categories having a heaviest one of said category weights;
- said last layer of said intermediate nodes is immediately upward of said leaf nodes, and represents said values corresponding to the one of said categories having a lightest one of said category weights; and
- each of said leaf nodes having an upward path through an upward set of said intermediate nodes to said root node, wherein said corresponding one of said query results for said each leaf node pertains to all of the respective values in each of said intermediate nodes of said upward set of intermediate nodes; and providing an interface for navigating said nodes of said tree-shaped hierarchy including a representation of a position with respect to a present node of said tree-shaped hierarchy and, when said present node is one of said intermediate nodes, displaying said value represented by said intermediate node.

4. The search support method as set forth in claim 3, further comprising:

after creating said tree-shaped hierarchy, determining for said leaf nodes having an identical one of said query results an uptree of intermediate nodes;

when said present node is one of said leaf nodes having said uptree of intermediate nodes, displaying a corresponding uptree indicator for each of said intermediate nodes of said uptree.

5. A search support method, comprising:

receiving user parameters including categories with weights, and values corresponding to said categories;

receiving query results based on said user parameters;

creating a tree-shaped hierarchy by:
- creating a root node,
- in a category order based on said weights, providing for each said category a layer of intermediate nodes relating to said corresponding values, and
- for each query result in said query results, providing at least one leaf node having a path through an upward set of said intermediate nodes to said root node, wherein said query result for said at least one leaf node pertains to said corresponding value for each of said intermediate nodes of said upward set; and providing said tree-shaped hierarchy to a user interface.

6. A search support method, comprising:

receiving user parameters including categories with weights, and values corresponding to said categories;

receiving query results based on said user parameters;

creating a tree-shaped hierarchy of nodes based on said query results with levels of intermediate nodes corresponding to said categories in order of said weights;

providing node information from said tree-shaped hierarchy;

displaying said query results in a restricted presentation using said node information.

7. The search support method as set forth in claim 6, wherein said node information further comprises:
- a node type indicator;
- an upward node indicator;
- at least one downward indicator; and
- a category/value indicator.

8. The search support method as set forth in claim 7, wherein said node information further comprises uptree information.

9. A search interface, comprising:

a parameter input interface, including:
- a plurality of first regions for accepting categories;
- a plurality of second regions for accepting category weights corresponding to said categories; and
- a plurality of third regions for accepting, for each of said categories, one or more corresponding values; and a search result output interface, including:
- first navigation indicators indicating a position with respect to an upward direction in a tree-shaped hierarchy; and
- second navigation indicators showing a position with respect to a downward direction in said tree-shaped hierarchy;

wherein said tree-shaped hierarchy is structured with a root node, intermediate nodes in layers corresponding to said categories, said layers being ordered according to said category weights, said intermediate nodes each representing one of said one or more corresponding values, and leaf nodes each representing a query result from at least one of:
a structured database, and
a non-structured database.

10. The search interface as set forth in claim 9, wherein said search result output interface further comprises an upward region and a downward region, said upward region including the first navigation indicators, and said downward region including said second navigation indicators.

11. The search interface as set forth in claim 10, wherein said upward region further comprises, for points of isolated semantic identity, supplemental navigation indicators for upward traverse of said tree-shaped hierarchy to a plurality of nodes.

12. A search application server, comprising:
a memory;
a search application, defining predetermined steps, in said memory; and
a processor accessing said memory and performing said predetermined steps defined by said search application;
wherein said predetermined steps comprise:
receiving user parameters including categories with weights, and values corresponding to said categories;
receiving query results based on said user parameters;
creating a tree-shaped hierarchy by:
creating a root node,
in a category order based on said weights, providing for each said category a layer of intermediate nodes relating to said corresponding values, and
for each query result in said query results, providing at least one leaf node having a path through an upward set of said intermediate nodes to said root node, wherein said query result for said at least one leaf node pertains to said corresponding value for each of said intermediate nodes of said upward set; and
outputting node information relating to said tree-shaped hierarchy.

13. The search application server as set forth in claim 12, wherein said node information further comprises:
a node type indicator;
an upward node indicator;
at least one downward indicator; and
a category/value indicator.

14. The search application server as set forth in claim 13, wherein said node information further comprises uptree information for points of isolated semantic identity.

15. A computer program product, comprising:
a class library, and
a computer-readable medium bearing said class library;
said class library including:
a first class for constructing user agent objects,
a second class for constructing content agent objects, and
a third class for constructing network agent objects;
said first class providing said user agent objects respective member functions for:
receiving user parameters including categories with respective weights, and values corresponding to said categories, and
providing said user parameters as an output;
said second class providing said content agent objects respective member functions for:

receiving said user parameters;
creating a query from said user parameters;
providing said query to one of said network agent objects;
receiving from one of said network agent objects one or more query results; and
creating, from said one or more query results, a tree-shaped hierarchy; and
said third class providing said network agent objects respective member functions for:
sending said query to a query search universe comprising one or more search engines and database management systems;
receiving from said query search universe one or more query results; and
providing to one of said content agent objects said one or more query results.

16. The computer program product as set forth in claim 15, wherein said tree-shaped hierarchy is created so as to comprise:
a root node representing said query;
a plurality of ordered levels of intermediate nodes, each of said ordered levels corresponding to one of said categories, wherein the order of said levels of intermediate nodes in proximity to said root node is determined based on said respective weight of said corresponding one of said categories, and wherein s aid intermediate nodes for a heaviest weighted one of said categories are connected to said root node;
said intermediate nodes at each given one of said plurality of ordered levels corresponding to said respective values for said one of said categories to which said given one of said ordered levels corresponds; and
said tree-shaped hierarchy having leaf nodes connected to said intermediate nodes, each of said leaf nodes corresponding to one of said query results, each of said leaf nodes having an upward path through an upward set of said intermediate nodes to said root node, wherein said one of said query results pertains to all of the respective values in each of said intermediate nodes of said upward set of intermediate nodes.

17. The computer program product as set forth in claim 16, wherein said second class further provides said content agent objects with respective member functions for determining uptree information for points of isolated semantic identity.

18. A computer program product for enabling a computer to support a user search, comprising:
software instructions for enabling the computer to perform predetermined operations, and
a computer readable medium bearing the software instructions;
the predetermined operations including the steps of:
receiving user parameters including categories with weights, and values corresponding to said categories;
receiving query results based on said user parameters;
creating a tree-shaped hierarchy by:
creating a root node,
in a category order based on said weights, providing for each said category a layer of intermediate nodes relating to said corresponding values, and
for each query result in said query results, providing at least one leaf node having a path through an upward set of said intermediate nodes to said root node, wherein said query result for said at least one leaf node pertains to said corresponding value for each of said intermediate nodes of said upward set; and outputting node information relating to said tree-shaped hierarchy.

19. The computer program product as set forth in claim 18, wherein said node information further comprises:

a node type indicator;

an upward node indicator;

at least one downward indicator; and a category/value indicator.

20. The computer program product as set forth in claim 19, wherein said node information further comprises uptree information for points of isolated semantic identity.

21. A search support method, comprising:

outputting user parameters representing a search request;

receiving, after said outputting step, a carrier wave with signal components representing node information, said node information including:

a node type indicator, an upward node indicator, at least one downward indicator, a category/value indicator, and an uptree indicator relating to a point of isolated semantic identity; and displaying query results in a restricted presentation using said node information.

* * * * *

UNITED STATES PATENT AND TRADEMARK OFFICE
CERTIFICATE OF CORRECTION

PATENT NO.    : 6,567,812 B1
DATED         : May 20, 2003
INVENTOR(S)   : Garrecht et al.

It is certified that error appears in the above-identified patent and that said Letters Patent is hereby corrected as shown below:

<u>Title page,</u>
Item [*] Notice: Subject to any disclaimer, the term of this patent is extended or adjusted under 35 USC 154(b) by (233) days
Delete the phrase "by 233 days" and insert -- by 304 days --

Signed and Sealed this

Twenty-fifth Day of November, 2003

JAMES E. ROGAN
*Director of the United States Patent and Trademark Office*